(12) United States Patent
Nozawa

(10) Patent No.: US 9,721,195 B2
(45) Date of Patent: Aug. 1, 2017

(54) SPECTROMETRY DEVICE, IMAGE FORMING DEVICE, AND SPECTROMETRY METHOD

(71) Applicant: Seiko Epson Corporation, Tokyo (JP)

(72) Inventor: Takeshi Nozawa, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/185,373

(22) Filed: Jun. 17, 2016

(65) Prior Publication Data

US 2016/0379095 A1    Dec. 29, 2016

(30) Foreign Application Priority Data

Jun. 23, 2015    (JP) ................................ 2015-125877

(51) Int. Cl.

| | |
|---|---|
| *H04N 1/00* | (2006.01) |
| *H04N 1/60* | (2006.01) |
| *G06K 15/02* | (2006.01) |
| *G01J 3/02* | (2006.01) |
| *G01J 3/06* | (2006.01) |

(Continued)

(52) U.S. Cl.

CPC ............ *G06K 15/027* (2013.01); *G01J 3/021* (2013.01); *G01J 3/0229* (2013.01); *G01J 3/06* (2013.01); *G01J 3/26* (2013.01); *G01J 3/2823* (2013.01); *G01J 3/46* (2013.01); *G01J 3/463* (2013.01); *G01J 3/52* (2013.01); *H04N 1/00015* (2013.01); *H04N 1/00023* (2013.01); *H04N 1/00034* (2013.01); *H04N 1/00045* (2013.01); *H04N 1/00068* (2013.01); *H04N 1/00082* (2013.01); *H04N 1/6036* (2013.01); *H04N 1/6044* (2013.01); *G01J 2003/061* (2013.01);

(Continued)

(58) Field of Classification Search
None
See application file for complete search history.

(56) References Cited

U.S. PATENT DOCUMENTS

| | | |
|---|---|---|
| 6,189,794 B1 | 2/2001 | Iwaguchi et al. |
| 8,109,594 B2 | 2/2012 | Onishi |

(Continued)

FOREIGN PATENT DOCUMENTS

| | | | |
|---|---|---|---|
| JP | 08193916 A | * | 7/1996 |
| JP | 09015046 A | * | 1/1997 |

(Continued)

*Primary Examiner* — Scott A Rogers
(74) *Attorney, Agent, or Firm* — Harness, Dickey & Pierce, P.L.C.

(57) ABSTRACT

A printer includes a spectroscope that has a variable wavelength interference filter which incidents light from a measurement region, and a light receiving section which receives light from the variable wavelength interference filter and which outputs a detection signal according to an amount of received light, a carriage moving unit which relatively moves the spectroscope along one direction with respect to a measurement target of spectrometry and moves the measurement region with respect to the measurement target, and a timing detection circuit which has a differential circuit that differentiates the detection signal and outputs a differentiation signal, wherein in a case where the measurement target is a color patch, spectrometry in which the amount of received light is detected starts based on the differential signal.

20 Claims, 15 Drawing Sheets

(51) Int. Cl.
  *G01J 3/12*   (2006.01)
  *G01J 3/28*   (2006.01)
  *G01J 3/46*   (2006.01)
  *G01J 3/52*   (2006.01)
  *G01J 3/26*   (2006.01)

(52) U.S. Cl.
  CPC .................. *G01J 2003/1226* (2013.01); *G01J 2003/2826* (2013.01)

(56) References Cited

U.S. PATENT DOCUMENTS

| | | | |
|---|---|---|---|
| 2016/0253924 A1* | 9/2016 | Kwak | G09B 19/167 |
| | | | 701/123 |
| 2016/0258813 A1* | 9/2016 | Kuri | G01J 3/0229 |
| 2016/0261774 A1* | 9/2016 | Kuri | G01J 3/463 |
| 2016/0263895 A1* | 9/2016 | Kuri | B41J 2/165 |
| 2016/0282182 A1* | 9/2016 | Kanai | G01J 3/26 |
| 2016/0286054 A1* | 9/2016 | Kuri | H04N 1/00023 |
| 2016/0370230 A1* | 12/2016 | Nishimura | G01J 3/46 |

FOREIGN PATENT DOCUMENTS

| | | | | |
|---|---|---|---|---|
| JP | 10-019673 A | | 1/1998 | |
| JP | 11-096284 A | | 4/1999 | |
| JP | 11142752 A | * | 5/1999 | |
| JP | 2001159567 A | * | 6/2001 | |
| JP | 2008-281549 A | | 11/2008 | |
| JP | 2012198177 A | * | 10/2012 | |
| JP | EP 2642741 A2 | * | 9/2013 | ......... H04N 1/00023 |
| JP | 2013217654 A | * | 10/2013 | |
| JP | 2014137459 A | * | 7/2014 | ......... G03G 15/0189 |

\* cited by examiner 211   212   213   214

FIG. 12

| MEASUREMENT ORDER | COLORIMETRY PATTERN WAVELENGTH BAND | | | | | |
|---|---|---|---|---|---|---|
| | FIRST SHORT-WAVELENGTH REGION λ1 | SECOND SHORT-WAVELENGTH REGION λ2 | FIRST MEDIUM-WAVELENGTH REGION λ3 | SECOND MEDIUM-WAVELENGTH REGION λ4 | FIRST LONG-WAVELENGTH REGION λ5 | SECOND LONG-WAVELENGTH REGION λ6 |
| 1 | 400 | 460 | 520 | 580 | 640 | 700 |
| 2 | 420 | 480 | 540 | 600 | 660 | 400 |
| 3 | 440 | 500 | 560 | 620 | 680 | 420 |
| 4 | 460 | 520 | 580 | 640 | 700 | 440 |
| 5 | 480 | 540 | 600 | 660 | 400 | 460 |
| 6 | 500 | 560 | 620 | 680 | 420 | 480 |
| 7 | 520 | 580 | 640 | 700 | 440 | 500 |
| 8 | 540 | 600 | 660 | 400 | 460 | 520 |
| 9 | 560 | 620 | 680 | 420 | 480 | 540 |
| 10 | 580 | 640 | 700 | 440 | 500 | 560 |
| 11 | 600 | 660 | 400 | 460 | 520 | 580 |
| 12 | 620 | 680 | 420 | 480 | 540 | 600 |
| 13 | 640 | 700 | 440 | 500 | 560 | 620 |
| 14 | 660 | 400 | 460 | 520 | 580 | 640 |
| 15 | 680 | 420 | 480 | 540 | 600 | 660 |
| 16 | 700 | 440 | 500 | 560 | 620 | 680 |

SPECTROMETRY DEVICE, IMAGE FORMING DEVICE, AND SPECTROMETRY METHOD

BACKGROUND

1. Technical Field

The present invention relates to a spectrometry device, an image forming device, a spectrometry method, and the like.

2. Related Art

In the related art, a colorimetry device unit is known which performs colorimetry on each color patch of a colorimetry pattern while moving a colorimeter holder on which a colorimeter is mounted along the colorimetry pattern which is arranged along one direction (for example, refer to JP-A-2008-281549).

In JP-A-2008-281549, for example, the colorimetry unit is mounted on a printer, colorimetry of a colorimetry pattern which is printed using the printer is performed, and calibration of a printer is carried out based on a colorimetry result.

Here, in a case where the colorimetry unit such as described in JP-A-2008-281549 is moved in one direction at, for example, a constant speed, and carries out spectrometry with respect to a color patch during the movement, it is necessary to acquire an amount of light of a plurality of wavelengths to be measured while a measurement region moves within the color patch due to the colorimetry device unit (spectrometry device).

However, there are cases where it is not possible to start spectrometry at an actual measurement start position due to a change in the movement speed of the colorimetry device unit, deviation from the installation position of the color patch, or the like, the measurement region from start of measurement to end of measurement passes through the color patch, the timing of the measurement start is too early, and the position of the measurement region deviates with respect to the color patch. In such a case, since spectrometry is carried out at a position which is separated from the color patch, it is not possible to appropriately carry out spectrometry with respect to the color patch, and colorimetry precision worsens.

SUMMARY

An advantage of some aspects of the invention is to provide a spectrometry device, an image forming device, and a spectrometry method which are able to carry out spectrometry at an appropriate position.

According to an aspect of the invention, there is provided a spectrometry device including a spectroscope that has a variable wavelength interference filter which incidents light from a measurement region, and a light receiving section which receives light from the variable wavelength interference filter and which outputs a detection signal according to an amount of received light, a movement mechanism which relatively moves the spectroscope with respect to a measurement target and moves the measurement region with respect to the measurement target, and a differential circuit which differentiates the detection signal and outputs a differentiation signal, in which in a case where the measurement target is a color patch, spectrometry in which the amount of received light is detected by the light receiving section starts based on a differential signal.

Here, in this application example, starting spectrometry based on the differential signal includes a case where in addition to referencing the differential signal, spectrometry starts with reference to a signal (detection signal) which is obtained by performing amplification processing and the like on the differential signal.

In this application example, when the measurement region is relatively moved with respect to the color patch, a timing (start timing) at which spectrometry starts is detected and spectrometry starts based on the differential signal which is obtained by differential processing in a differential circuit the detection signal according to the amount of received light from the measurement region.

That is, when the measurement region is moved to the color patch from a region other than the color patch, and the measurement region and the color patch start to overlap, an output value of the output signal is changed according to a change of the amount of overlapping, and the differential signal is output according to the amount of change. Then, when the entire region of the measurement region overlaps with the color patch and the amount of overlapping of the measurement region and the color patch is not changed, since the detection signal is substantially constant, the value of the differential signal is substantially "zero". In this application example, even if the position of the measurement region with respect to the color patch is not ascertained in advance, the start timing can be easily detected based on the differential signal. Accordingly, generation of defects such that the region other than the color patch is measured by the measurement start position being deviated can be suppressed, and spectrometry can be carried out on the color patch with high precision.

In addition, even if a dimension of the color patch is set by adding a margin considering the positional deviation other than a minimum dimension according to movement speed due to the movement mechanism, required time for colorimetry (measurement time), and the like, since deviation from the measurement start position can be suppressed, the margin can be reduced, and the dimension of the color patch can be reduced. Accordingly, in comparison to a case where deviation from the measurement start position is suppressed by increasing the margin, the time in which the measurement region passes through one color patch can be shortened, and the required time for spectrometry can be shortened.

In the spectrometry device in this application example, it is preferable that the movement mechanism relatively moves the spectroscope along one direction with respect to the measurement target.

In this application example, the relative movement of the measurement region along one direction with respect to the color patch is the same as in the application example described above. Spectrometry starts based on the differential signal. In such a configuration, a timing at which the entire region of the measurement region overlaps with the color patch and spectrometry is able to be appropriately carried out can be more reliably and easily detected based on the differential signal.

In the spectrometry device in this application example, it is preferable that in a case where the measurement target is a color patch group which includes a plurality of color patches which are disposed along the one direction, a wavelength of light which passes through the variable wavelength interference filter is set for an output value of the detection signal when the measurement region is moved to within respective regions of the plurality of color patches which are included in the color patch group to be in the same increase or decrease direction.

Here, in this application example, the increase or decrease direction has the same meaning as increasing or decreasing an output value of the detection signal when the measurement region is moved within the color patch in any color patch included in the color patch group. For example, a case of decreasing is a case where the wavelength of the light which passes through the variable wavelength interference filter is set to a wavelength at which reflectance is reduced within the color patch more than outside of the color patch. In this case, the amount of received light decreases and the detection signal decreases in accordance with the measurement region moving within the color patch from outside of the color patch.

In this application example, when spectrometry is carried out on the color patch group which is configured to include a plurality of color patches, the wavelength (that is, emission wavelength of the variable wavelength interference filter) at which the variable wavelength interference filter is passed through is set such that the increase or decrease direction of each detection signal is the same when the measurement region is moved within each color patch. By configuring in this manner, when detection of the start timing is performed, only the detection signal in which the output value increases, or only the detection signal in which the output value decreases is input to the differential circuit. Thereby, the differential circuit which is driven by a single power source can be used. Accordingly, corresponding to the increase or decrease of the differential signal according to respective reflectance characteristics of adjacent color patches, a device configuration can be simplified in comparison to a case in which it is necessary to use a differential circuit which is driven by a dual-power source.

In the spectrometry device in this application example, it is preferable that in a case where the measurement target is a color patch group in which the reflectance with respect to a predetermined wavelength in each of the plurality of color patches is in the same increase or decrease direction along the one direction, the wavelength of light which passes through the variable wavelength interference filter is set to the predetermined wavelength.

In this application example, when the color patch group in which the increase or decrease direction in the reflectance in the predetermined wavelength is the same along one direction is set as the measurement target, the emission wavelength of the variable wavelength interference filter is set to the predetermined wavelength. Thereby, in each color patch, when the start timing is detected, even if the same predetermined wavelength is set, the same increase or decrease direction of the detection value can be set between each color patch. Accordingly, when detection of the start timing is performed, the same increase or decrease direction can be set even if the set value of the emission wavelength of the variable wavelength interference filter is not modified, and simplification of the process can be achieved according to spectrometry.

In the spectrometry device in this application example, it is preferable that in a case where the measurement target is a color patch group which has the same color phase in each of the plurality of color patches that are disposed in the one direction and in which the reflectance with respect to a characteristic wavelength of the color phase is in the same increase or decrease direction along the one direction in each of the plurality of color patches, the wavelength of light which passes through the variable wavelength interference filter is set to the characteristic wavelength.

In this application example, when the color patch group in which the color phase is the same in each color patch, and the reflectance in the characteristic wavelength by which the color phase is characterized has the same increase or decrease direction between the color patches in one direction is set as the measurement target, the emission wavelength of the variable wavelength interference filter is set to the characteristic wavelength. By configuring in this manner, since the characteristic wavelength which has a comparatively large reflectance of the color patch is set as the emission wavelength of the variable wavelength interference filter, for example, other than the characteristic wavelength, the output value of the detection signal can be increased in comparison to a case in which the wavelength in which the reflectance is relatively small is set to the emission wavelength. Accordingly, an SN ratio of the detection signal and the differential signal can be improved, and detection precision of the start timing can be improved.

Here, characteristic wavelength has the meaning of a wavelength which indicates a characteristic of the spectrum such as a peak wavelength or center wavelength (for example, center wavelength of a wavelength range which corresponds to a predetermined color phase or a center wavelength with respect to a plurality of peaks) of a spectrum of the color patch.

In the spectrometry device in this application example, it is preferable that the wavelength of the light which passes through the variable wavelength interference at the timing at which spectrometry starts is set as an initial wavelength in spectrometry.

In this application example, when spectrometry is carried out in the plurality of wavelengths that include the wavelength (detection wavelength) which is set during detection of the start timing, the detection wavelength is set as the initial wavelength. By configuring in this manner, when spectrometry is carried out after the start timing is detected, since it is not necessary to set the emission wavelength of the variable wavelength interference filter to a wavelength which is different from the detection wavelength, shortening of a required time for spectrometry can be achieved.

In the spectrometry device in this application example, it is preferable to perform a timing detection with reference to the differential signal after the end of spectrometry without performing detection of a timing at which spectrometry starts with reference to the differential signal while spectrometry is carried out.

In this application example, in a period in which spectrometry is carried out, the spectrometry device performs detection of the start timing with reference to the differential signal from the end of spectrometry until the start timing of subsequent spectrometry is detected without performing detection of the start timing with reference to the differential signal. For example, a switch circuit is provided which switches between an output state in which the differential signal is output from the differential circuit and a non-output state in which there is no output. Then, the switch circuit is set in the non-output state in a period in which spectrometry is carried out with respect to one color patch and the output state in a period in which spectrometry is not carried out. Thereby, generation of erroneous detection of the start timing can be suppressed by referencing the differential signal according to the detection signal during spectrometry.

In the spectrometry device in this application example, it is preferable to detect a measurement error for spectrometry based on the output value of the differential signal at the timing at which spectrometry ends.

In this application example, in a case where spectrometry is appropriately carried out, the differential signal is substantially "zero" at the timing at which the spectrometry process ends. Meanwhile, at the end timing of spectrometry, in a case where the measurement region spans adjacent color patches, the differential signal is not substantially "zero", and is a value according to a change of the detection signal. In this case, there is a concern that spectrometry is not appropriately carried out. In this application example, it can detected that there is a possibility that it is not possible to appropriately carry out spectrometry by detecting a measurement error based on the differential signal. Accordingly, based on the detection result, a process can be carried out such that a movement speed due to the movement mechanism or a dimension of the color patch is appropriately adjusted, and it is also possible to suppress generation of the error.

According to another aspect of the invention, there is provided a spectrometry device which carries out spectrometry on a measurement target including a light receiving section which receives light from a measurement region and outputs a detection signal according to an amount of received light, a movement mechanism which relatively moves the light receiving section with respect to the measurement target and moves the measurement region with respect to the measurement target, and a differential circuit which differentiates the detection signal and outputs a differentiation signal, in which in a case where the measurement target is a color patch, spectrometry starts based on the differential signal.

In this application example, in the same manner as the application example according to the spectrometry device described above, even if a position of the measurement region is not ascertained in advance with respect to the color patch, the start timing can be easily detected based on the differential signal. Accordingly, generation of defects such that the region other than the color patch is measured by the measurement start position being deviated can be suppressed, and spectrometry can be carried out on the color patch with high precision.

In addition, since deviation from the measurement start position can be suppressed, even if a dimension of the color patch is set in one direction by adding a margin which considers the positional deviation with respect to a minimum dimension according to a movement speed due to a movement mechanism, required time for colorimetry (measurement time), and the like, the dimension can be reduced according to the margin, and the dimension of the color patch can be reduced. Accordingly, the time in which one color patch passes through the measurement region can be shortened and the required time for spectrometry can be shortened in comparison to a case corresponding to deviation from the measurement start position by increasing the dimension according to the margin.

According to still another aspect of the invention, there is provided an image forming device which includes the spectrometry device according to the application example and an image forming section which forms an image on an image forming target.

In this application example, spectrometry can be performed with respect to the formed color patch by the spectrometry device upon forming the color patch as described above on the image forming target using the image forming section. In addition, in such an image forming device, it can be confirmed whether or not the color of the formed color patch is the same color as a color which is commanded to the image forming section, and in a different case, feedback can be carried out on the image forming section according to the spectrometry result.

In the image forming device in this application example, it is preferable that in the image forming section, a plurality of color patches are disposed along one direction, and a color patch group in which reflectance with respect to a predetermined wavelength in each of the plurality of color patches is in the same increase or decrease direction along the one direction is formed on the image forming target.

In this application example, among the color patches along one direction, the color patch group in which reflectance with respect to the predetermined wavelength is the same as the increase or decrease direction of the reflectance with respect to the predetermined wavelength is formed by the image forming section. With respect to such a color patch group, as described above, a differential circuit can be used which is driven by a single power source as the differential circuit of the spectrometry device and the device configuration can be simplified by carrying out spectrometry using the spectrometry device. Furthermore, when detection of the start timing is performed, the same increase or decrease direction can be set even if the set value of the emission wavelength of the variable wavelength interference filter is not modified, and simplification of a process can be achieved according to spectrometry.

In the image forming device in this application example, it is preferable that in the image forming section, a color patch group that is the measurement target in which color phases in each of the plurality of color patches are the same, and reflectance with respect to a characteristic wavelength of the color phase is in the same increase or decrease direction along the one direction is formed on the image forming target.

In this application example, the color patch group in which the color phase is the same in each color patch, and the reflectance in the characteristic wavelength by which the color phase is characterized has the same increase or decrease direction between the color patches in one direction is formed by the image forming section. With respect to such a color patch group, as described above, an SN ratio of the detection signal and the differential signal can be improved, and detection precision of the start timing can be improved by carrying out spectrometry using the spectrometry device.

According to still another aspect of the invention, there is provided a spectrometry method, which uses the spectrometry device including a spectroscope that has a variable wavelength interference filter which incidents light from a measurement region, and a light receiving section which receives light from the variable wavelength interference filter and which outputs a detection signal according to an amount of received light, a movement mechanism which relatively moves the spectroscope with respect to a measurement target and moves the measurement region with respect to the measurement target, and a differential circuit which differentiates the detection signal and outputs a differentiation signal, and in the spectrometry device, spectrometry on the measurement target is carried out, the method including: moving the measurement region with respect to the color patch which is the measurement target; and starting spectrometry in which the amount of received light is detected based on the differential signal.

In this application example, in the same manner as the application example according to the spectrometry device, even if a position of the measurement region is not ascertained in advance with respect to the color patch, the start timing can be easily detected based on the differential signal. Accordingly, generation of defects such that the region other than the color patch is measured by the measurement start position being deviated can be suppressed, and spectrometry can be carried out on the color patch with high precision.

In addition, since deviation from the measurement start position can be suppressed, even if a dimension of the color patch is set in one direction by adding a margin which considers the positional deviation with respect to a minimum dimension according to a movement speed due to a movement mechanism, required time for colorimetry (measurement time), and the like, the dimension can be reduced according to the margin, and the dimension of the color patch can be reduced. Accordingly, the time in which one color patch passes through the measurement region can be shortened and the required time for spectrometry can be shortened in comparison to a case corresponding to deviation from the measurement start position by increasing the dimension according to the margin.

BRIEF DESCRIPTION OF THE DRAWINGS

The invention will be described with reference to the accompanying drawings, wherein like numbers reference like elements.

FIG. 12 is a diagram illustrating an example of a relationship between a measured wavelength and a measured order in each color patch group in the first embodiment.

DESCRIPTION OF EXEMPLARY EMBODIMENTS

First Embodiment

A first embodiment of the invention will be described below based on the drawings. In the present embodiment, as an example of an image forming device of the invention, a printer 10 (ink jet printer) which is provided with a spectrometry device will be described below.

Printer Schematic Configuration

Figure 1:
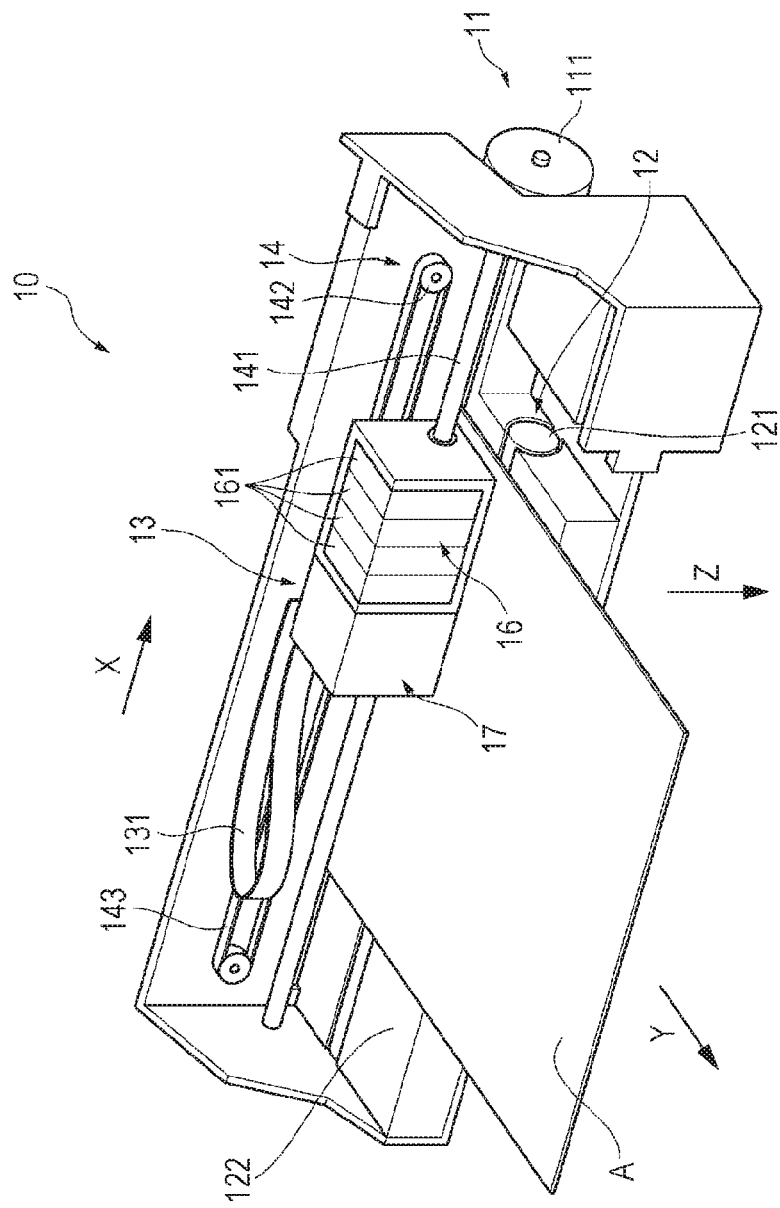
FIG. 1 is an outer appearance view illustrating a schematic configuration of a printer of a first embodiment according to the invention.
Figure 2:
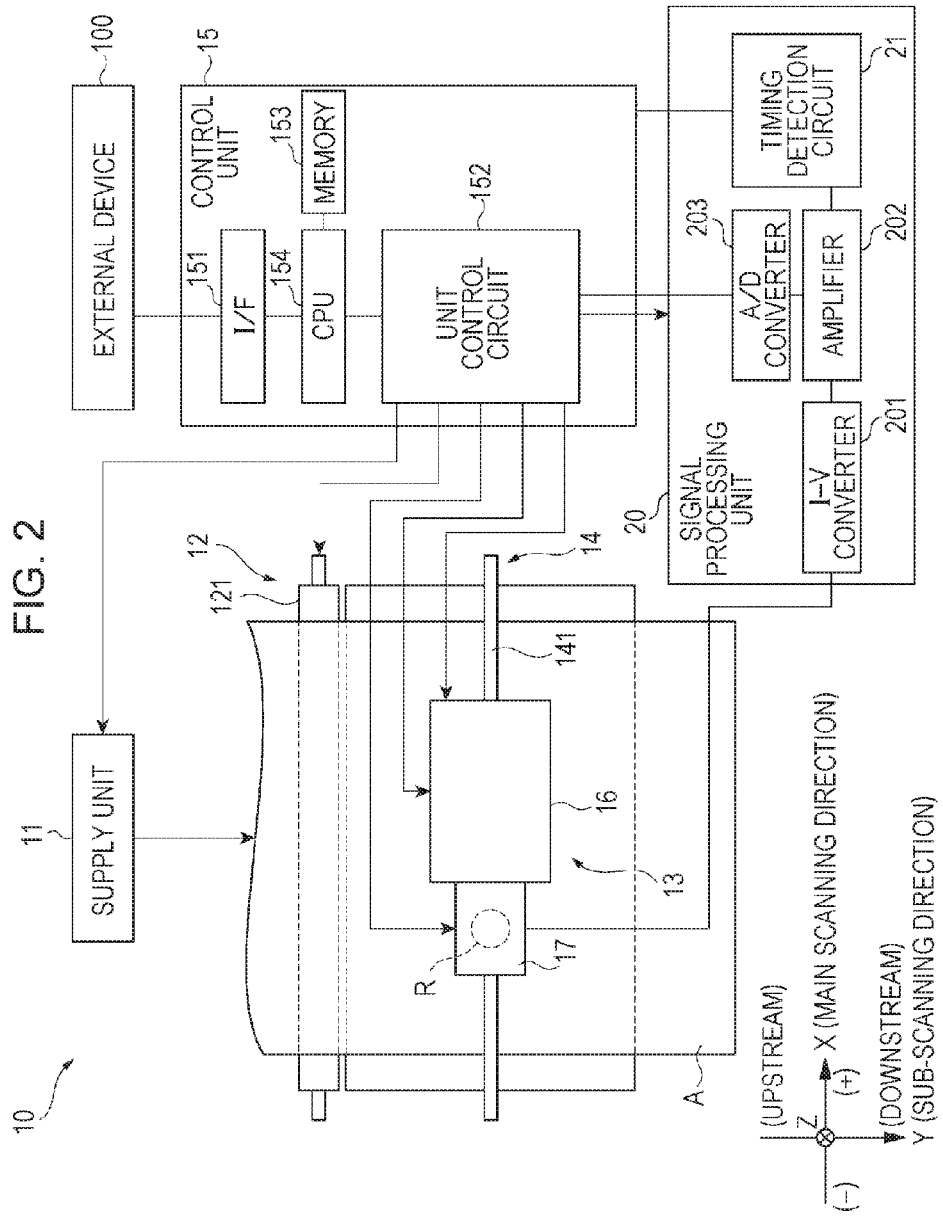
FIG. 2 is a block diagram illustrating a schematic configuration of a printer of the first embodiment.

FIG. 1 is a diagram illustrating a configuration example of an outer appearance of the printer 10 of the first embodiment. FIG. 2 is a block diagram illustrating a schematic configuration of the printer 10 of the embodiment.

As shown in FIG. 1, the printer 10 is provided with a supply unit 11, a transport unit 12, a carriage 13, a carriage moving unit 14, and a control unit 15 (refer to FIG. 2). For example, the printer 10 controls each unit 11, 12, and 14 and the carriage 13, and prints an image on a medium A based on printing data which is input from an external device 100 of a personal computer and the like. In addition, the printer 10 of the embodiment forms a color patch 31 for colorimetry at a predetermined position on the medium A based on printing data for calibration set in advance (refer to FIG. 9 and the like), and performs spectrometry on the color patch 31. Thereby, in a case where the printer 10 determines whether or not there is color shift in a printed color in comparison to a measured value and the printing data for calibration with respect to the color patch 31, and there is color shift, color correction is performed based on the measured value.

Each configuration of the printer 10 is described below in detail.

The supply unit 11 is a unit which supplies the medium A which in an image forming target (in the embodiment, a white paper surface is displayed) to an image formation position. For example, the supply unit 11 is provided with a roll body 111 (refer to FIG. 1) on which the medium A is wound, a roll drive motor (not shown in the diagram), a roll drive gear train (not shown in the diagram), and the like. Then, the roll drive motor is rotatably driven, and rotational force of the roll drive motor is transmitted to the roll body 111 via the roll drive gear train based on a command from the control unit 15. Thereby, the roll body 111 is rotated, and a paper surface which is wound around the roll body 111 is supplied to a downstream side (+Y direction) in a Y direction (sub-scanning direction).

Here, in the embodiment, an example is indicated in which the paper surface which is wound around the roll body 111 is supplied, but is not limited thereto. For example, the medium A of the paper surface and the like which is loaded in a tray and the like may be supplied one sheet at a time by a roller or the like, and the medium A may be supplied using any supply method.

The transport unit 12 transports the medium A which is supplied from the supply unit 11 along the Y direction. The transport unit 12 is configured to include a transport roller 121, a driven roller (not shown in the diagram) which is disposed to interpose the medium A with the transport roller 121 and is driven in the transport roller 121, and a platen 122.

When the driving force is transmitted from the transport motor which is not shown in the drawings and the transport motor is driven by the control of the control unit 15, the transport roller 121 is rotationally driven due to the rotational force and the medium A is transported along the Y direction in a state of being interposed by the driven roller. In addition, the platen 122 which faces the carriage 13 is provided on the downstream side (+Y side) in the Y direction of the transport roller 121.

The carriage 13 is provided with a printing section 16 which prints an image on the medium A, and a spectroscope which performs spectrometry of a predetermined measurement region R on the medium A (refer to FIG. 2).

The carriage 13 is provided to be movable along a scanning direction (one direction, X direction in the invention) which intersects with a Y direction using the carriage moving unit 14.

In addition, the carriage 13 is connected to the control unit 15 using a flexible circuit 131, and carries out a printing process using the printing section 16 (image forming process with respect to medium A) and a spectrometry process using the spectroscope 17 based on the command from the control unit 15.

Here, a detailed configuration of the carriage 13 will be described later.

The carriage moving unit 14 configures the movement mechanism in the invention, and reciprocally moves the carriage 13 along the X direction based on the command from the control unit 15.

For example, the carriage moving unit 14 is configured to include a carriage guide shaft 141, a carriage motor 142, and a timing belt 143.

The carriage guide shaft 141 is disposed along the X direction, and both end sections are fixed to a chassis, for example, of the printer 10. The carriage motor 142 drives the timing belt 143. The timing belt 143 is supported so as to be substantially parallel to the carriage guide shaft 141, and a portion of the carriage 13 is fixed. Then, when the carriage motor 142 is driven based on the command from the control unit 15, the timing belt 143 travels forward and reverse, and the carriage 13 which is fixed to the timing belt 143 reciprocally moves by being guided on the carriage guide shaft 141.

Next, a configuration of the printing section 16 and the spectroscope 17 which are provided in the carriage 13 will be described based on the drawings.

Printing Section (Image Forming Section) Configuration

The printing section 16 is an image forming section of the invention, and forms an image on the medium A by individually discharging ink on a portion which faces the medium A.

In the printing section 16, an ink cartridge 161 which corresponds to ink of a plurality of colors is mounted so as to freely attach and detach, and supplies ink from each ink cartridge 161 to an ink tank (not shown in the diagram) via a tube (not shown in the diagram). In addition, nozzles (not shown in the diagram) which discharge ink droplets are provided corresponding to each color on a lower surface of the printing section 16 (position which faces the medium A). For example, a piezo element is disposed on the nozzle, ink droplets which are supplied from the ink tank are discharged and landed on the medium A and a dot is formed by driving the piezo element.

Spectroscope Configuration

Figure 3:
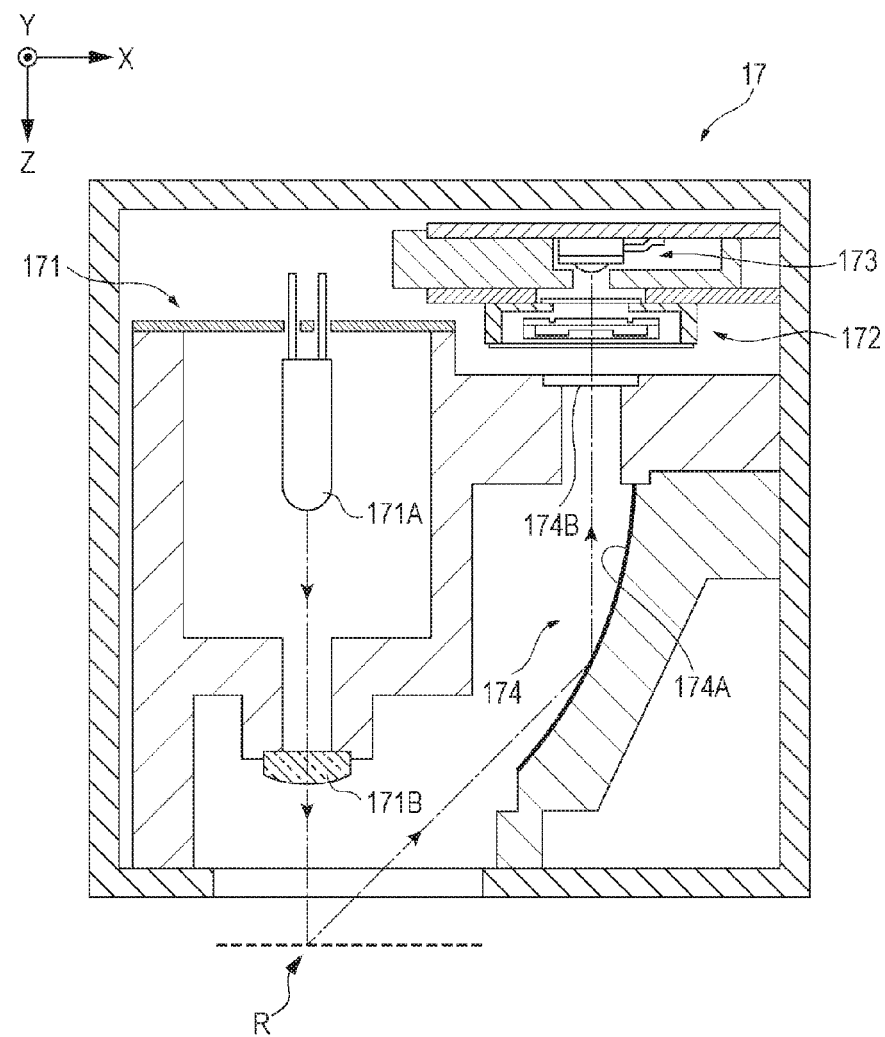
FIG. 3 is a sectional view illustrating a schematic configuration of a spectroscope of the first embodiment.

FIG. 3 is a sectional view illustrating a schematic configuration of the spectroscope 17.

As shown in FIG. 3, the spectroscope 17 is provided with a light source section 171, an optical filter device 172, a light receiving section 173, and a light guiding section 174.

The spectroscope 17 irradiates illumination light on the medium A from the light source section 171, and incidents a light component which is reflected on the medium A on the optical filter device 172 using the light guiding section 174. Then, the optical filter device 172 receives light using the light receiving section 173 by emitting (transmitting) light of a predetermined wavelength from the reflected light. In addition, the optical filter device 172 is able to select a transmission wavelength (emission wavelength) based on a control from the control unit 15, and spectrometry is possible on the measurement region R on the medium A by measuring the light of each wavelength in visible light.

Light Source Section Configuration

The light source section 171 is provided with a light source 171A and a light condensing section 171B. The light source section 171 irradiates light which is emitted from the light source 171A within the measurement region R of the medium A from a normal direction with respect to the front surface of the medium A.

A light source which is able to emit light of each wavelength in a visible light range is preferable as the light source 171A. As such a light source 171A, it is possible, for example, to exemplify a halogen lamp or a xenon lamp, a white LED, and the like, and in particular, a white LED is preferable which is easily installable within a space that is limited to within the carriage 13. For example, the light condensing section 171B is configured using a light condensing lens or the like, and light from the light source 171A is condensed in the measurement region R. Here, in FIG. 3, in the light condensing section 171B, only one lens (light condensing lens) is displayed, but there may be a configuration in which a plurality of lenses are combined.

Optical Filter Device Configuration

Figure 4:
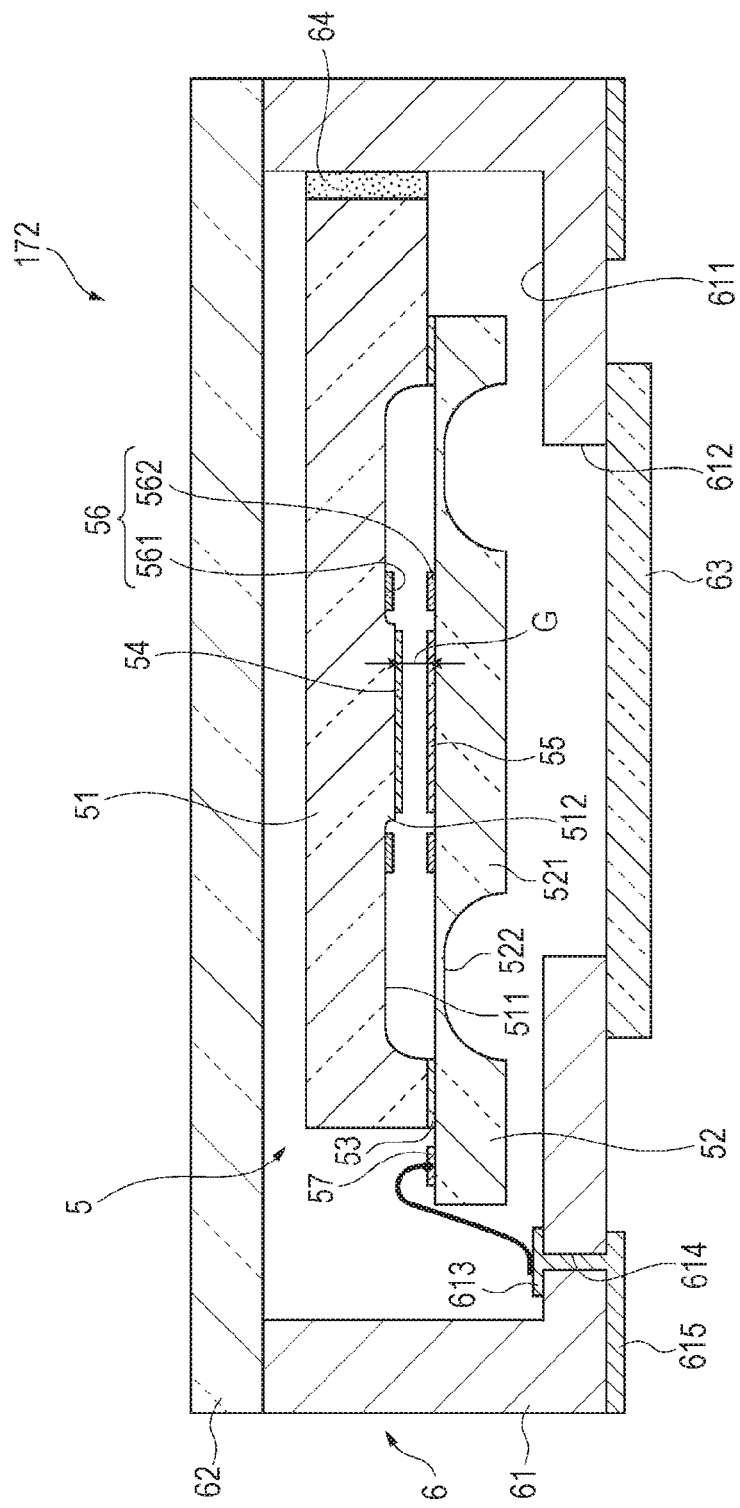
FIG. 4 is a sectional view illustrating a schematic configuration of an optical filter device of the first embodiment.

FIG. 4 is a sectional view illustrating a schematic configuration of the optical filter device 172.

The optical filter device 172 is provided with a chassis 6 and a variable wavelength interference filter 5 which is stored inside the chassis 6 (variable wavelength interference filter).

Variable Wavelength Interference Filter Configuration

The variable wavelength interference filter 5 is a variable wavelength Fabry-Perot etalon element, and as shown in FIG. 4, is provided with a fixed substrate 51 and a movable substrate 52 which are translucent, and the fixed substrate 51 and the movable substrate 52 are integrally configured by being bonded using a bonding film 53.

The fixed substrate 51 is provided with a first groove section 511 which is formed by etching and a second groove section 512 with a shallower groove depth than the first groove section 511. Then, a fixed electrode 561 is provided in the first groove section 511, and a fixed reflective film 54 is provided on the second groove section 512.

For example, the fixed electrode 561 is formed in an annular form to surround the second groove section 512, and faces a movable electrode 562 which is provided on the movable substrate 52.

For example, the fixed reflective film 54 is configured by a dielectric multilayer film in which a metallic film such as Ag, an alloy film such as an Ag alloy, a high refractive index layer, and a low refractive index layer are laminated, or a laminated body in which the metallic film (alloy film) and the dielectric multilayer film are laminated.

The movable substrate 52 is provided with a movable section 521 and other than the movable section 521, and is provided with a holding section 522 which holds the movable section 521.

The movable section 521 is formed to have a larger thickness dimension than the holding section 522. The movable section 521 is formed to have a larger diameter dimension than the diameter dimension of an outer peripheral edge of the fixed electrode 561, and is provided with the movable electrode 562 and a movable reflective film 55 on the surface which faces the fixed substrate 51 of the movable section 521.

The movable electrode 562 is provided at a position which faces the fixed electrode 561.

The movable reflective film 55 is disposed via a gap G at a position which faces the fixed reflective film 54. It is possible to use a reflective film with the same configuration as the fixed reflective film 54 described above as the movable reflective film 55.

The holding section 522 is a diaphragm which surrounds the periphery of the movable section 521, and is formed to have a smaller thickness dimension than the movable section 521. Such a holding section 522 is more easily bent than the movable section 521, and it is possible to displace the movable section 521 to the fixed substrate 51 side due to slight electrostatic attraction. Thereby, in a state in which parallelism of the fixed reflective film 54 and the movable reflective film 55 is held, it is possible to modify the gap dimension of the gap G.

Here, in the embodiment, the holding section 522 with a diaphragm form is exemplified, but is not limited thereto, and for example, a configuration or the like in which holding sections with a beam form that are disposed at equal angular intervals are provided may be set with a planar center point as the center.

In addition, a plurality of electrode pads 57 which are individually connected to the fixed electrode 561 and the movable electrode 562 are provided on an outer periphery section of the movable substrate 52 (a region which does not face the fixed substrate 51).

Chassis Configuration

As shown in FIG. 4, the chassis 6 is provided with a base 61 and a glass substrate 62. For example, the base and the glass substrate 62 are able to utilize low-melting-point glass bonding that uses a glass plate (low-melting-point glass), adhesion using epoxy resin and the like, and the like, and thereby, an internal space is formed therein, and the variable wavelength interference filter 5 is stored within the internal space.

For example, the base 61 is configured by laminating ceramic on a thin plate, and has the variable wavelength interference filter 5 and a storable concave section 611. For example, the variable wavelength interference filter 5 is fixed to a side surface of the concave section 611 of the base 61 using a fixing member 64.

A light passage hole 612 is provided on the bottom surface of the concave section 611 of the base 61. The light passage hole 612 is provided so as to include a region which overlaps with reflective films 54 and 55 of the variable wavelength interference filter 5. In addition, cover glass 63 which covers the light passage hole 612 is bonded on the surface at the opposite side from the glass substrate 62 of the base 61.

In addition, an internal terminal section 613 which is connected to the electrode pad 57 of the variable wavelength interference filter 5 is provided on the base 61, and the internal terminal section 613 is connected to an external terminal section 615 which is provided outside the base 61 via a through hole 614. The external terminal section 615 is electrically connected to the control unit 15.

Light Receiving Section and Light Guiding System Configuration

Retuning to FIG. 3, the light receiving section 173 is disposed on an optical axis of the variable wavelength interference filter 5, and light is received which passes through the variable wavelength interference filter 5. Then, the light receiving section 173 outputs a detection signal (current value) according to the amount of received light based on the control of the control unit 15. Here, the detection signal which is output by the light receiving section 173 is input to the control unit 15 via an I-V converter (not shown in the diagram), an amplifier (not shown in the diagram), and an AD converter (not shown in the diagram).

The light guiding section 174 is provided with a reflecting mirror 174A and a bandpass filter 174B.

In the measurement region R, the light guiding section 174 reflects light which is reflected at 45° with respect to the front surface of the medium A on the optical axis of the variable wavelength interference filter 5 using the reflecting mirror 174A. The bandpass filter 174B passes light of a visible light range (for example, 380 nm to 720 nm), and cuts ultraviolet light and infrared light. Thereby, in the light receiving section 173, light of a wavelength which is selected by the variable wavelength interference filter 5 in the visible light range is received in the variable wavelength interference filter 5 by incidenting light in the visible range.

Signal Processing Unit Configuration

A signal processing unit 20 amplifies a light reception signal (analog signal) from a light receiving element, then converts to a digital signal and outputs to the control unit 15. In addition, the signal processing unit 20 outputs the detection signal to the control unit 15 in order to detect a measurement start timing based on the input light reception signal. As shown in FIG. 2, the signal processing unit 20 is configured to include an I-V converter 201, an amplifier 202, an A/D converter 203, and a timing detection circuit 21.

The I-V converter 201 converts the light reception signal which is input from the light receiving section 173 to a voltage value, and outputs to the amplifier 202.

The amplifier 202 amplifies the voltage (detection voltage) according to the detection signal which is input from the I-V converter 201. The amplifier 202 is configured to be able to modify an amplification factor according to an output level of the detection signal.

Here, as exemplified in the drawings, the I-V converter 201 and the amplifier 202 are configured to be separate from the light receiving section 173, but may be integrally configured with the light receiving section 173 as an integrated circuit (IC).

The A/D converter 203 converts the detection voltage (analog signal) which is input from the amplifier 202 to a digital signal, and outputs to the control unit 15.

Figure 5:
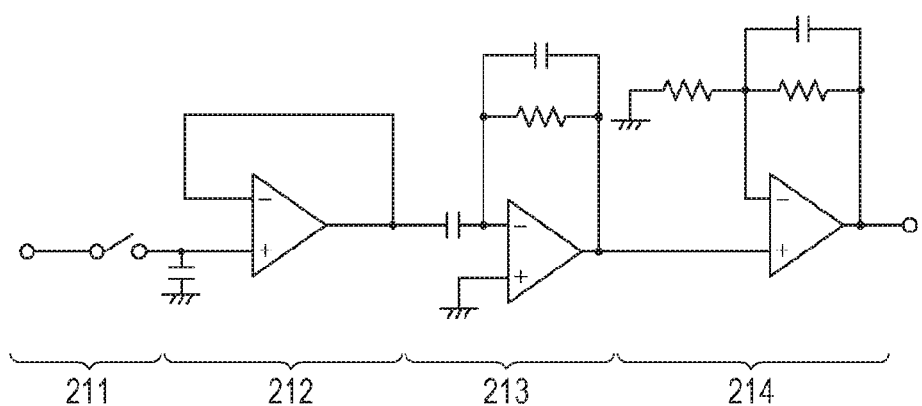
FIG. 5 is a block diagram illustrating a functional configuration of a CPU which is included in a control unit in the first embodiment.

FIG. 5 is a diagram schematically illustrating a configuration of the timing detection circuit.

As will be described later, in a case where the timing detection circuit 21 performs colorimetry of a color chart which includes a color patch group in which a plurality of color patches are disposed along one direction, the entire region of a colorimetry region overlaps with a color patch which is a measurement target, and the detection signal is output to the control unit 15 in order to detect the measurement start timing at which spectrometry on the color patch is possible.

The timing detection circuit 21 is configured to include a switch circuit 211, a sample and hold circuit (S/H circuit) 212, a differential circuit 213, and an amplifier circuit 214.

An output state is set in which the switch circuit 211 is set on at a time other than during spectrometry on the color patch and the detection signal that is an output of the timing detection circuit 21 is output, and a non-output state is set in which the detection signal is not output during spectrometry on the color patch. The switch circuit 211 sets the output state and the non-output state according to a control signal (switch signal) from the control unit 15.

The S/H circuit 212 acquires a voltage value of the detection signal and outputs a sampling signal to the differential circuit 213 according to the voltage value at a predetermined timing according to control of the control unit 15.

The differential circuit 213 carries out differential processing on the sampling signal which is output from the S/H circuit 212, and outputs the differential signal to the amplifier circuit 214. In the embodiment, the differential circuit 213 is driven by a single power source. Here, although described later, the measurement region R by the spectroscope 17 starts to overlap the color patch of the measurement target, and while the entire region of the measurement region R overlaps with the color patch, the output value of the differential circuit 213 is high (positive value) according to the amount of received light. Then, when the entire region of the measurement region R overlaps with the measurement target color patch, the output value of the differential circuit 213 is low. It is possible to detect that the entire region of the measurement region R overlaps with the color patch and spectrometry is possible based on the change of the output value.

The amplifier circuit 214 amplifies the differential signal from the differential circuit 213 and outputs the detection signal to the control unit 15. The amplifier circuit 214 is configured to be able to modify gain, and sets to a gain according to the output from the differential circuit 213. For example, when colorimetry is carried out on the color chart, the differential signal when the measurement region R is moved over two color patches which are adjacently disposed is set according to the differential signal in which the output value (voltage value) is minimized. That is, the gain of the amplifier circuit 214 is set such that the voltage value of the detection signal according to the differential signal is a predetermined value or more, for example, to a maximum output value of the amplifier circuit 214. Thereby, in the measurement region R, the output from the timing detection circuit 21 is low when a position which overlaps with only one color patch is moved (measurable period Ta in FIG. 11). In addition, in the measurement region R, the output from the timing detection circuit 21 is high when a position which simultaneously overlaps with two adjacent color patches is moved (refer to FIG. 11).

Control Unit Configuration

As shown in FIG. 2, the control unit 15 is configured to include an I/F 151, a unit control circuit 152, a memory 153, and a central processing unit (CPU) 154.

The I/F 151 inputs printing data which is input from the external device 100 is input to the CPU 154.

The unit control circuit 152 is provided with a printing circuit which controls each of the supply unit 11, the transport unit 12, the control section 16, the light source 171A, the variable wavelength interference filter 5, the light receiving section 173, the carriage moving unit 14, and the signal processing unit 20, and controls operations of each unit based on a command signal from the CPU 154. Here, the control circuit of each unit is provided separately from the control unit 15, but may be connected to the control unit 15.

The memory 153 stores various programs and various data which controls the operation of the printer 10.

For example, when controlling the variable wavelength interference filter 5, with respect to an applied voltage of an electrostatic actuator 56, V–λ data which indicates a wavelength of light that passes through the variable wavelength interference filter 5, printing profile data in which an amount of discharge of each ink with respect to color data that is included is stored as the printing data, and the like are given as the various data. In addition, a light emission characteristic (light emission spectrum) with respect to each wavelength of the light source 171A, a light reception characteristic (light reception sensitivity characteristic) with respect to each wavelength of the light receiving section 173, and the like may be stored. Furthermore, for example, printing data for calibration in order to form a color chart which will be described later, scanning speed of the carriage 13 during spectrometry, measurement time which is necessary for spectrometry on one color patch, and the like are stored as the various data.

Figure 6:
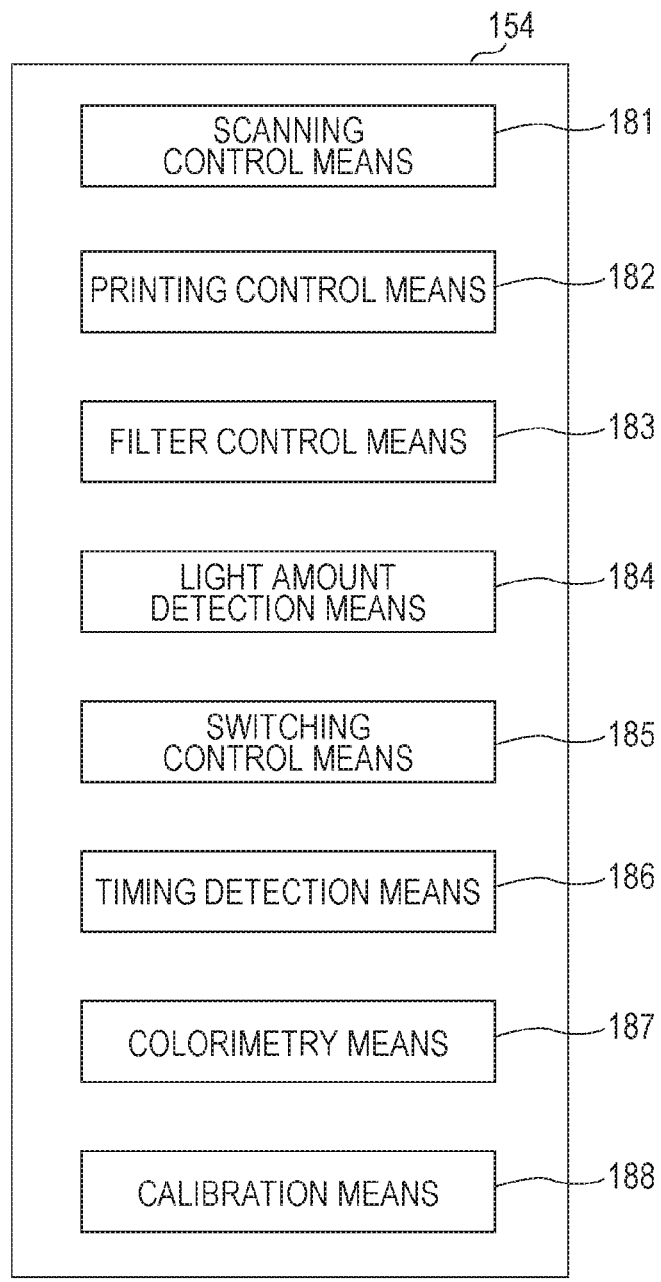
FIG. 6 is a diagram illustrating a schematic configuration of a timing detection circuit of the first embodiment.

FIG. 6 is a block diagram illustrating a functional configuration of the CPU which is included in the control unit 15 of the printer 10.

As shown in FIG. 6, the CPU 154 functions as scanning control means 181, printing control means 182, filter control means 183, light amount detection means 184, switch control means 185, timing detection means 186, colorimetry means 187, calibration means 188, and the like by executing reading of various programs which are stored in the memory 153.

The scanning control means 181 outputs a command signal which drives the supply unit 11, the transport unit 12, and the carriage moving unit 14 to the unit control circuit 152. Thereby, the unit control circuit 152 drives the roll drive motor of the supply unit 11 and supplies the medium A to the transport unit 12. In addition, the unit control circuit 152 drives the transport motor of the transport unit 12, and transports the predetermined region of the medium A along the Y direction up to a position which faces the carriage 13 of a platen 122. In addition, the unit control circuit 152 drives the carriage motor 142 of the carriage moving unit 14, and moves the carriage 13 at a predetermined speed (scanning speed) along the X direction.

Here, during colorimetry of the color chart, the scanning control means 181 refers to the scanning speed which is stored in the memory 153 in advance, and outputs the command signal which moves the carriage 13 at the scanning speed to the unit control circuit 152.

The printing control means 182 outputs the command signal which controls the printing section 16 to the unit control circuit 152, for example, based on printing data which is input from the external device 100. In addition, in the embodiment, the printing control means 182 forms the color patch 31 on the medium A based on printing data for calibration which commands formation of the color patch 31 of a predetermined color set in advance at the predetermined position. Here, the printing data for calibration may not be stored in the memory 153, and may be input from the external device 100.

Detailed description of the color patch 31 will be described later.

When the command signal is output from the printing control means 182 to the unit control circuit 152, the unit control circuit 152 outputs a print control signal to the printing section 16, and discharges ink on the medium A by driving the piezo element which is provided in the nozzle. Here, when carrying out printing, a dot formation operation in which dots are formed by moving the carriage 13 along the X direction and discharging ink from the printing section 16 during movement and a transport operation in which the medium A is transported in the Y direction are alternatively repeated, and an image which is configured from a plurality of dots is printed on the medium A.

The filter control means 183 reads a driving voltage to the electrostatic actuator 56 with respect to the wavelength of the light which passes through the variable wavelength interference filter 5 from V–λ data of the memory 153, and outputs the command signal to the unit control circuit 152.

Thereby, the unit control circuit 152 applies the driving voltage which is commanded to the variable wavelength interference filter 5, and transmits light of a desired transmission wavelength (emission wavelength) from the variable wavelength interference filter 5.

In addition, before starting spectrometry on the color patch, the filter control means 183 applies an initial voltage which corresponds to the predetermined transmission wavelength (initial wavelength) which is set in advance according to the color patch to the electrostatic actuator 56. Furthermore, the filter control means 183 switches the voltage which is applied to the electrostatic actuator 56 based on the measurement start timing of the color patch that is detected by the timing detection means 186 which will be described later, movement speed of the carriage 13 which is driven by the scanning control means 181, and elapsed time from the start of movement.

The light amount detection means 184 outputs the driving signal which drives the light receiving section 173 to the unit control circuit 152, and acquires the amount of received light based on the detection signal from the light receiving section 173. Here, in each color patch, the light amount detection means 184 stores the amount of light which is detected in each measurement wavelength in the memory 153 corresponding to the color patch and the measured wavelength.

The switch control means 185 outputs the command signal to the unit control circuit 152 such that the switch circuit 211 is set to off other than during spectrometry of the color patch. That is, the switch control means 185 sets the switch circuit 211 to off during spectrometry on the color patch, and sets the timing detection circuit 21 is to the non-output state. In addition, after spectrometry on one color patch ends, the switch control means 185 outputs the detection signal from the timing detection circuit 21, and until subsequent spectrometry is started, the switch circuit 211 is set to on and the timing detection circuit 21 is set in the output state.

The timing detection means 186 detects the measurement start timing of the color patch based on the detection signal of the timing detection circuit 21. That is, when the measurement region R is moved along the X direction, according to the movement of the carriage 13, the measurement start timing is detected by detecting the change of the detection signal from the timing detection circuit 21 according to the position of the measurement region R with respect to the color patch from high to low.

The colorimetry means 187 measures chromaticity in the color patch based on a spectrometry result with respect to the light of the plurality of wavelengths which are obtained with respect to each color patch.

The calibration means 188 corrects (updates) printing profile data based on the colorimetry result by the colorimetry means 187 and printing data for calibration.

Here, detailed operations of each functional configuration in the control unit 15 will be described later.

Spectrometry Method

Next, a spectrometry method in the printer 10 of the embodiment will be described based on the drawings.

Figure 7:
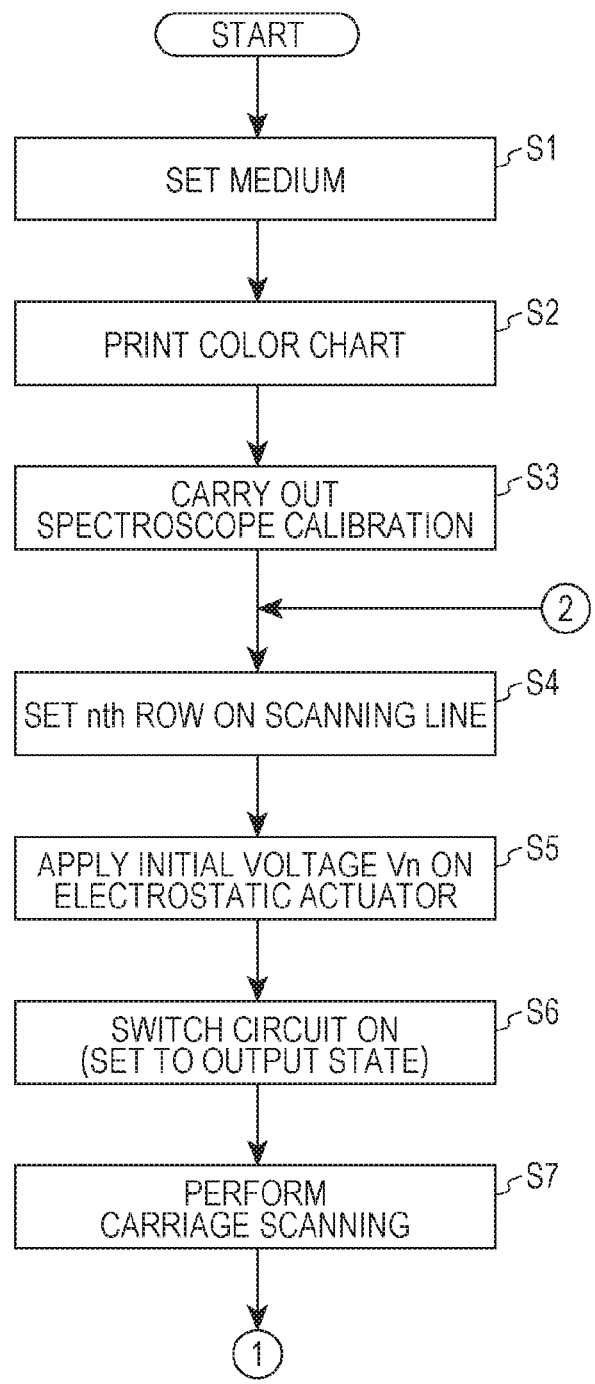
FIG. 7 is a flow chart illustrating a spectrometry method in the printer of the first embodiment.
Figure 8:
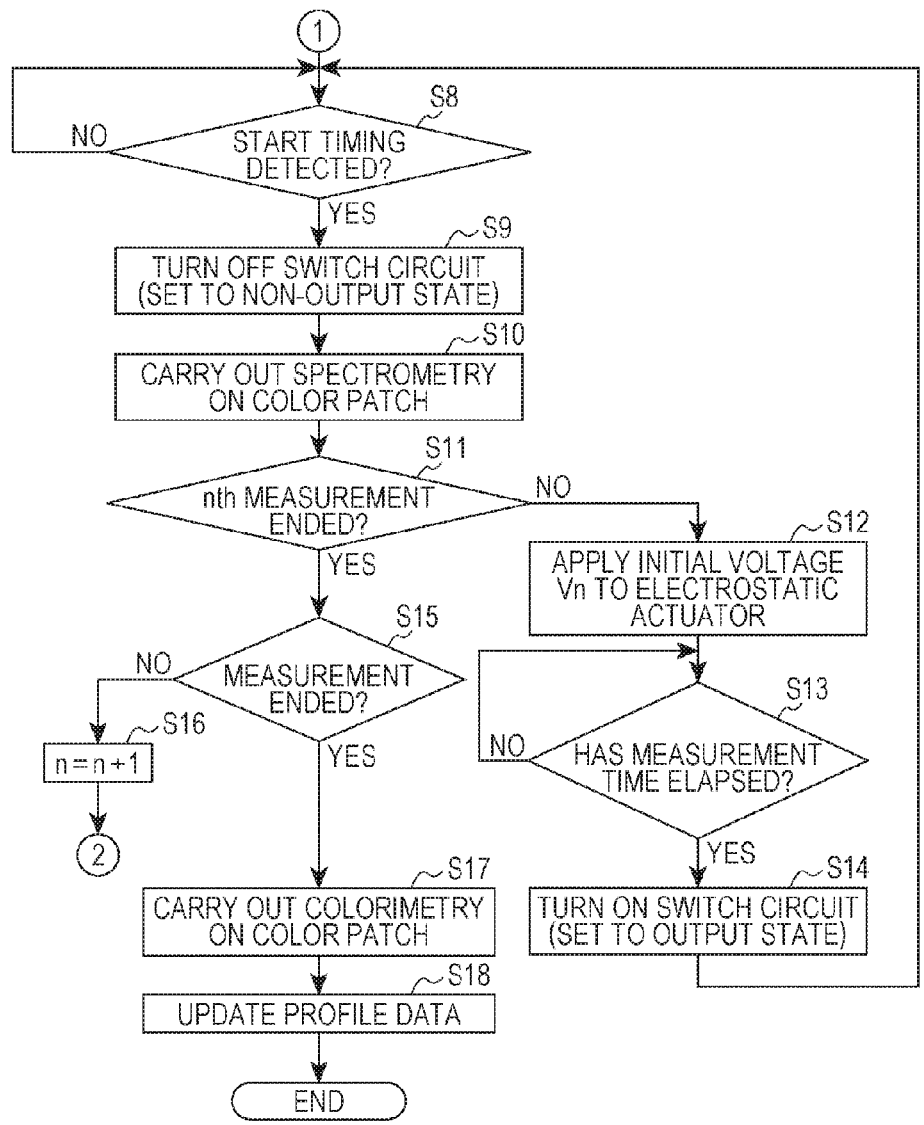
FIG. 8 is a flow chart illustrating the spectrometry method in the printer of the first embodiment.

FIGS. 7 and 8 are flow charts illustrating the spectrometry method in the printer 10.

Here, in the embodiment, the wavelength region which is the measurement target is a visible light range from 400 nm to 700 nm, and an example in which spectrometry is carried out is illustrated based on an amount of light of wavelengths at intervals of 20 nm with the initial wavelength set as 700 nm.

Color Chart Formation

In the spectrometry method by the printer 10, first, the color chart which includes the color patch 31 is formed on the medium A.

Here, the scanning control means 181 sets the medium A at a predetermined position (step S1). That is, the scanning control means 181 controls the supply unit 11 and the transport unit 12 and transports the medium A in a sub-scanning direction (+Y direction), and sets a predetermined printing start position of the medium A on the platen 122. In addition, the scanning control means 181 moves the carriage 13 to the initial position (for example, a −X side end section of the main scanning direction).

After this, the printing control means 182 reads the printing data for calibration from the memory 153, and prints the color chart on the medium A simultaneously to the control by the scanning control means 181 (step S2).

That is, the carriage 13 is scanned by the scanning control means 181 at the +X side, for example, at a constant speed. For example, the printing control means 182 specifies the position of the printing section 16 of the carriage 13 according to the time from the start of scanning, and dots are formed by discharging ink from the nozzle of a predetermined color at the predetermined position based on the printing data for calibration (dot formation operation). In addition, when the scanning control means 181 moves the carriage 13 up to the +X side end section, the medium A is transported in the +Y direction by controlling the supply unit 11 and the transport unit 12 (transport operation). Then, the scanning control means 181 scans the carriage 13 in the −X direction, and the printing control means 182 forms the dots at the predetermined position based on the printing data for calibration.

The color chart is formed on the medium A by repeating the dot formation operation and the transport operation as described above.

After this, the printing control means 182 reads the printing data for calibration from the memory 153, and prints the color chart on the medium A simultaneously to the control by the scanning control means 181 (step S2).

That is, the carriage 13 is scanned by the scanning control means 181 at the +X side, for example, at a constant speed. For example, the printing control means 182 specifies the position of the printing section 16 of the carriage 13 according to the time from the start of scanning, and dots are formed by discharging ink from the nozzle of a predetermined color at the predetermined position based on the printing data for calibration (dot formation operation). In addition, when the scanning control means 181 moves the carriage 13 up to the +X side end section, the medium A is transported in the +Y direction by controlling the supply unit 11 and the transport unit 12 (transport operation). Then, the scanning control means 181 scans the carriage 13 in the −X direction, and the printing control means 182 forms the dots at the predetermined position based on the printing data for calibration.

The color chart is formed on the medium A by repeating the dot formation operation and the transport operation as described above.

Figure 9:
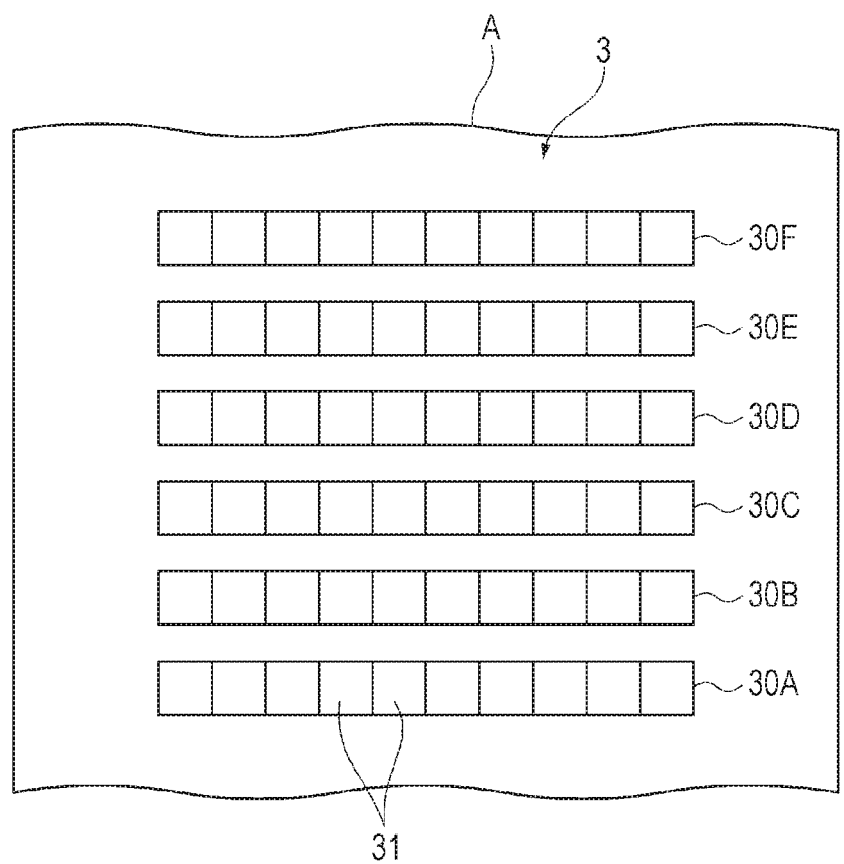
FIG. 9 is a diagram illustrating an example of a color chart in the first embodiment.

FIG. 9 is a diagram illustrating an example of a color chart which is formed in the embodiment.

As shown in FIG. 9, in the embodiment, a plurality of color patch groups 30A to 30F which are configured by disposing the color patches 31 of a plurality of colors without a gap along the X direction are formed by printing the color chart 3 which is disposed along the Y direction. Each color patch group 30A to 30F form color phases which are different from each other. In addition, each color patch group 30A to 30F forms each color patch 31 such that reflectance is decreased in a characteristic wavelength of each color phase toward the +X side. Here, characteristic wavelength has the meaning of a peak wavelength of a spectrum of the color patch 31, a center wavelength of a wavelength range which corresponds to a color phase, a center wavelength with respect to a plurality of peaks which are included in the wavelength range, or the like, and is a wavelength which indicates a characteristic of the spectrum of the color patch 31.

Here, a start bar which is a straight line that is parallel to the Y direction at the −X side of the color patch groups 30A to 30F, and a linear goal bar which is parallel to the Y direction at the +X side of the color patch groups 30A to 30F may be provided on the color chart 3.

Figure 10:
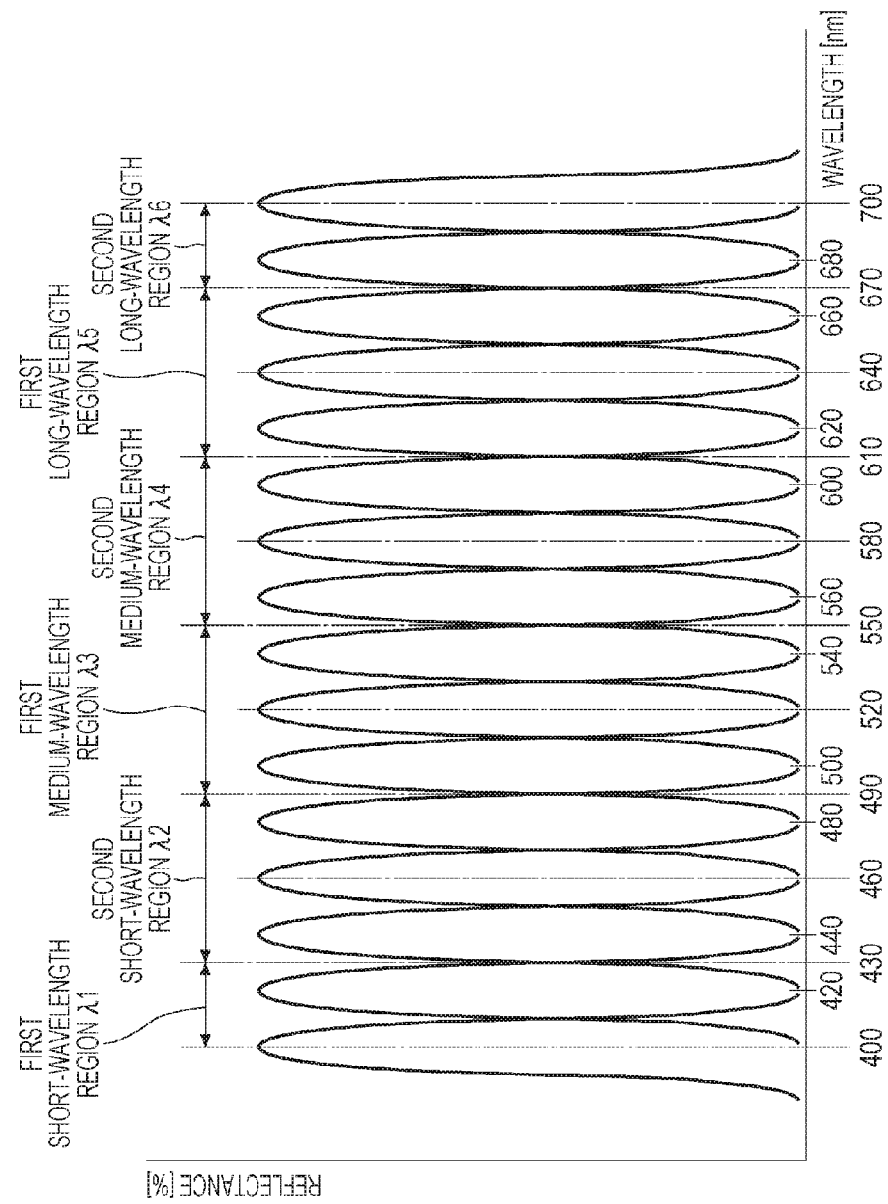
FIG. 10 is a diagram illustrating an example of a correspondence relationship between a color phase and a wavelength of a color patch group in the color chart in the first embodiment.

FIG. 10 is a diagram illustrating a correspondence relationship between respective color phases and wavelengths of each of the color patch groups 30A to 30F.

Out of the each of the color patches 30A to 30F, the first color patch group 30A which is positioned at the +Y side, illustrated in FIG. 10, includes the color patch 31 which has the characteristic wavelength in a first short-wavelength region $\lambda 1$ (400 nm to 430 nm).

In addition, in the first color patch group 30A, out of the adjacent color patches 31, the color patch 31 which is positioned at the +X side has a smaller reflectance in the characteristic wavelength of the corresponding color phase than the color patch 31 which is positioned on the −X side. In other words, when the initial wavelength of the emission wavelength of the variable wavelength interference filter 5 is set as the characteristic wavelength (for example, 400 nm), the amount of received light (detection value) with respect to the initial wavelength of each color patch 31 becomes small toward the +X side.

In addition, a second color patch group 30B includes a plurality of color patches 31 which have the characteristic wavelength in a second short-wavelength region $\lambda 2$ (430 nm to 490 nm). For example, in the plurality of color patches 31, when a center wavelength 460 nm of the second short-wavelength region $\lambda 2$ is set as the initial wavelength, with respect to the initial wavelength, out of the adjacent color patches 31, the color patch 31 which is positioned at the +X side has a smaller amount of received light (detection value).

In addition, a third color patch group 30C has the characteristic wavelength in a first medium-wavelength region $\lambda 3$ (490 nm to 550 nm), and in the same manner, includes the plurality of color patches 31 which are disposed so as to have the above relationship with respect to the initial wavelength 520 nm.

In addition, a fourth color patch group 30D has the peak wavelength in a second medium-wavelength region $\lambda 4$ (550 nm to 610 nm), and in the same manner, includes the plurality of color patches 31 which are disposed so as to have the above relationship with respect to the initial wavelength 580 nm.

In addition, a fifth color patch group 30E has the peak wavelength in a first long-wavelength region $\lambda 5$ (610 nm to 670 nm), and includes the plurality of color patches 31 which are disposed so as to have the above relationship with respect to the initial wavelength 640 nm.

In addition, a sixth color patch group 30F has the peak wavelength in a second long-wavelength region $\lambda 6$ (670 nm to 700 nm), and includes the plurality of color patches 31 which are disposed so as to have the above relationship with respect to the initial wavelength 700 nm.

Here, the initial wavelength with respect to each color patch group is not limited to the example described above, and it is possible to set an arbitrary wavelength if the wavelength is included in the corresponding wavelength region.

Initial Settings

Returning to FIG. 7, after step S2, prior to spectrometry on the color chart 3, calibration processing (white calibration processing) of the spectroscope 17 is carried out (step S3).

For example, in the calibration processing, the control unit 15 moves the carriage 13 to the initial position of the −X side end section, and carries out spectrometry with respect to the white paper surface of the initial position. That is, the control unit 15 turns on the light source 171A, sequentially changes the driving voltage which is applied to the electrostatic actuator 56 of the variable wavelength interference filter 5 using the filter control means 183, is included in a measurement wavelength region, and the output values of the light receiving section 173 of n bands at intervals of 20 nm (for example, 16 bands) are respectively acquired. In addition, the control unit 15 measures the output value (dark voltage) in a state in which the light in the light receiving section 173 is not incident. Here, for example, the output value from the light receiving section 173 may be acquired in a state in which the light source 171A is turned off, for example, a light shielding plate which is able to advance and retreat with respect to an optical path may be provided on the light guiding section 174 of the spectroscope 17, and the output value may be acquired from the light receiving section 173 upon incidence of light to the light receiving section 173 which is shielded by the light shielding plate. Then, the colorimetry means 187, carries out calibration processing on the spectroscope 17 based on the spectrum and the dark voltage with respect to the white paper surface.

Here, in the embodiment, an example of the white paper surface of the medium A is indicated, but may be another color. In this case, since the color of the medium A (reflectance with respect to each wavelength) is known, it is possible to calculate a reference output value from the output value of each wavelength during calibration. In addition, during the formation of the color chart 3, the white color chart which is a reference color may be formed on the −X side of the color chart 3. In this case, in a case of having white as the ink pigment, it is possible to form the white color patch where the reflectance is known regardless of the medium A.

Spectrometry

Next, after step S3, when the ink of the printed color chart 3 is dried, the scanning control means 181 transports the medium A in the −Y direction by controlling the transport unit 12, an nth row color patch group of the measurement target in the color chart 3, for example, initially, a first row first color patch group 30A is positioned on a scanning straight line facing the carriage 13 (measurement region R) (step S4).

Here, as per the following description, the color patch 31 is disposed in n rows along the Y direction, and indicates the row number of the measurement target in the color patch 31 in the variable n (in the embodiment, n is 1 to 6). In step S3, the scanning control means 181 transports the medium A so as to position the first row first color patch group 30A on the platen 122 by setting the variable n=1. In addition, in step S3, the scanning control means 181 moves the carriage 13 to the −X side edge section (initial position X=0).

Next, the filter control means 183 applies the initial voltage Vn to the electrostatic actuator 56, and sets the transmission wavelength (measured wavelength) of the variable wavelength interference filter 5 to the initial wavelength according to the color patch group of the measurement target (step S5). After the initial voltage Vn is applied, when a stabilization time at which displacement of the movable section 521 converges elapses, a gap dimension of the variable wavelength interference filter 5 is a value which corresponds to the initial wavelength.

For example, the filter control means 183 applies an initial voltage V1 which corresponds to an initial wavelength 400 nm to the electrostatic actuator 56 with respect to the first color patch group 30A which is disposed in the first row (n=1).

Next, the switch control means 185 sets on the switch circuit 211, and the timing detection circuit 21 sets the detection signal to an output state which is able to be output (step S6).

After this, the scanning control means 181 moves the carriage 13 along the X direction and the first color patch group 30A is scanned (step S7). In addition, the control unit 15 acquires the detection signal which is output from the timing detection circuit 21 according to the output value from the light receiving section 173 by driving the S/H circuit 212 at a predetermined sampling period.

Measurement Start Timing Detection

The timing detection means 186 detects the measurement start timing based on the change of the detection signal (step S8). Here, the timing detection means 186 repeats the same determination up to detection of the measurement start timing.

Figure 11:
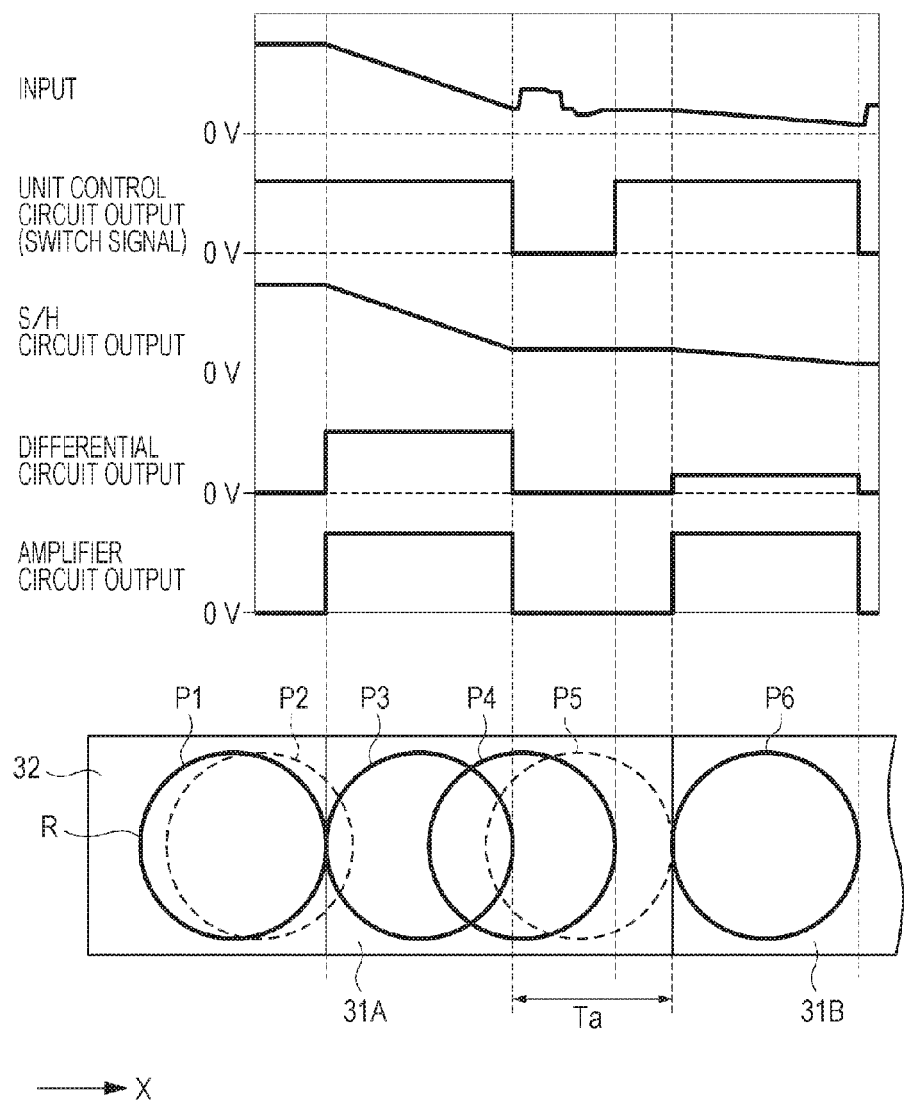
FIG. 11 is a diagram illustrating a relationship between an input signal in a timing detection circuit and an output signal of each circuit, and a position of a measurement region with respect to the color patch in the first embodiment.

FIG. 11 is a diagram schematically illustrating a relationship between an output change of the output signal of each circuit which will be described later in the amplifier 202 and the timing detection circuit, and the measurement region R with respect to the color patch. Here, in FIG. 11, as an example, out of the plurality of color patches, two color patches which are positioned on the −X side are illustrated.

As shown in FIG. 11, during the start of spectrometry, the measurement region R is positioned in a white region 32 further on the −X side than the color patch (P1 position). In addition, the switch circuit 211 is set on by the switch signal from the unit control circuit 152, and the timing detection circuit 21 is set in the output state.

Then, when the measurement region R moves along the X direction according to the movement of the carriage 13, and the end section at the +X side of the measurement region R starts to overlap with one color patch 31A (P2 position), and the output of the amplifier 202 according to an amount of overlapping decreases (equivalent to a second state). According to this, the output of the S/H circuit 212 decreases, the output of the differential circuit 213 and the amplifier circuit 214 are high, and a high detection signal is output from the timing detection circuit 21.

Furthermore, when the measurement region R moves along the X direction, is a P3 position, and the entire region of the measurement region R overlaps with the first color patch 31A, the amount of received light is not changed (equivalent to a first state). For this reason, output of the differential circuit 213 and the amplifier circuit 214 is changed to low, and the low detection signal is output from the timing detection circuit 21. The timing detection means 186 detects the measurement start timing by detecting that the output level of the detection signal is changed from high to low.

In addition, a period from the P3 position at which the −X side end section of the measurement region R which is indicated in FIG. 11 overlaps with the −X side end section of the color patch 31A up to P5 position at which the +X side end section of measurement region R overlaps with the +X side end section of the color patch 31A is a measurable period Ta which is able to appropriately carry out spectrometry of the color patch 31A. In the measurable period Ta, spectrometry is carried out, when the measurement time which is set within the measurable period Ta elapses, again, the variable wavelength interference filter 5 is set to the initial wavelength (P4 position). Then, in the same manner, the detection process of the measurement start timing in the color patch 31B which is disposed on the +X side of the color patch 31A is carried out, and the measurement start timing is detected at a timing at which the measurement region R is at a P6 position.

Here, as described above, in the embodiment, the first color patch group 30A is configured to have a reflectance peak wavelength in the first short-wavelength region λ1 (400 nm to 430 nm), and include a plurality of color patches 31 in which reflectance is different from each other with respect to the initial wavelength 400 nm. The color patch 31 is disposed such that the reflectance becomes small toward the +X side. For this reason, in an interval (interval from P1 to P2) at which the measurement region R that overlaps with the two color patches 31 which are arbitrarily adjacent, the output value of the S/H circuit with respect to the initial wavelength 400 decreases. In this case, even if the output signal of the differential circuit 213 is configured such that only a positive value is able to be output, it is possible to detect the measurement start timing. Accordingly, it is possible to adopt a configuration in which a single power source drives as the differential circuit 213, and it is possible to simplify the configuration of the timing detection circuit 21.

Here, between adjacent color patches 31, it is preferable that a difference of the input value of the timing detection circuit 21 with respect to the initial wavelength is 1 mV or more. That is, in a case where the measurement region R in FIG. 11 is from P3 position to P5 position, the value of the input signal is 1 mV or more in a case of P6 position. Thereby, it is possible to improve the SN ratio of the differential signal, and it is possible to more reliably detect the measurement start timing.

In addition, in a case where the output of the differential signal decreases, and it is not possible to detect the measurement start timing at a desired precision, it is possible to increase the output of the differential signal, and improve detection precision by increasing the amplification factor of the amplifier 202 (refer to FIG. 2). In other cases, it is possible to increase the output of the differential signal by increasing a reflectance difference with respect to the initial wavelength among adjacent color patches 31, and improving sensitivity of the light receiving section 173.

Color Patch Group Measurement

Returning to FIG. 8, when the entire region of the measurement region overlaps with the color patch 31 which is the measurement target (refer to P2 position of FIG. 11), and the color patch 31 appropriately comes to be in a state in which spectrometry is possible, YES is determined in step S8.

Next, the switch control means 185 sets the switch circuit 211 off and the timing detection circuit 21 is set to the non-output state (step S9).

Next, the control unit 15 carries out spectrometry on the color patch 31 (step S10). In detail, the filter control means 183 sequentially modifies the voltage which is applied to the electrostatic actuator 56 at a predetermined order which will be described later based on the V–λ data (refer to FIG. 12).

Thereby, the output value with respect to the light of a plurality of bands in the predetermined wavelength range (for example, 16 output values with respect to light of the wavelength at intervals of 20 nm in 400 nm to 700 nm) is output to the control unit 15. The control unit 15 stores the output value in an appropriate memory 153.

FIG. 12 is a diagram illustrating an example of a measurement order of each measurement wavelength respectively in each color patch group 30A to 30F which correspond to each wavelength band. Here, a first measurement wavelength is the initial wavelength.

As shown in FIG. 12, when the first color patch group 30A is measured, in each color patch, the control unit 15 sequentially measures each of 16 measurement wavelengths which are set at the interval of 20 nm from the initial wavelength 400 nm to 700 nm.

In addition, when the second color patch group 30B is measured, the control unit 15 sequentially measures each measurement wavelength from the initial wavelength 460 nm to 700 nm, then sequentially measures each measurement wavelength from the 400 nm to 440 nm.

In addition, also in the third color patch group 30C to the sixth color patch group 30F, in the same manner as the second color patch group 30B, the control unit 15 sequentially measures from the short wavelength side each measurement wavelength from the initial wavelength to 700 nm, and after that, sequentially measures from the short wavelength side each unmeasured measurement wavelength.

In a case where measurement is performed on each measurement wavelength in such an order, excluding the timing at which the measurement wavelength is modified from 700 nm to 400 nm, the interval dimension of the gap G is gradually modified by gradually modifying the driving voltage which is applied to the electrostatic actuator 56 in the filter control means 183. Thereby, a variation interval of the gap dimension is reduced, and it is possible to suppress vibration during displacement of the movable section 521.

Here, since in the sixth color patch group 30F, the initial wavelength is 700 nm, the measurement wavelength may be modified such that the measurement wavelength decreases from 700 nm at an interval of 20 nm, and also in this case, it is possible to decrease the variation interval of the gap dimension and suppress vibration during displacement of the movable section 521.

In addition, in the present example, an example is indicated in which the measurement wavelength is gradually increased (the gap dimension is gradually decreased), but is not limited thereto, and except for the initial wavelength, the driving voltage which is applied to the electrostatic actuator 56 may be modified such that each measurement wavelength gradually decreases (the gap dimension gradually increases).

Returning to FIG. 8, in step S10, when spectrometry on one color patch 31 ends, next, it is determined whether or not spectrometry on all color patches 31 in the nth row color patch group has ended (step S11).

In step S11, when NO is determined, in the same manner as step S5, since the filter control means 183 sets the measurement wavelength to the initial wavelength according to the color patch group of the measurement target, the initial voltage Vn is applied to the electrostatic actuator 56 (step S12).

Next, the filter control means 183 determines whether or not the predetermined measurement time which is necessary for spectrometry on one color patch 31 is exceeded from the start of spectrometry in step S10 (step S13). Measurement time includes the time which is necessary for carrying out spectrometry on 16 band measurement wavelengths and a stabilization time until a value in which the gap dimension corresponds to the initial voltage Vn is made stable, and is stored in the memory 153 which is set in advance. When the measurement time is exceeded, the transmission wavelength of the variable wavelength interference filter 5 is set to the initial wavelength which corresponds to the initial voltage Vn (refer to P4 position in FIG. 11).

When the transmission wavelength is set to the initial wavelength, in the same manner as step S6, the switch control means 185 sets the switch circuit 211 on, and sets the timing detection circuit 21 to the output state in which it is possible to output the detection signal (step S14). Then, returning to step S8, concerning all color to patches 31 which are disposed in the nth row, until spectrometry ends, the processes from step S8 to step S14 are repeatedly executed.

Meanwhile, when YES is determined in step S11 and measurement on the nth row ends, it is determined whether or not the measurement results of all of the color patches 31 of the color chart 3 are acquired, and spectrometry ends (step S15).

When NO is determined in step S15, the control unit 15 adds variable n=1 (step S16). After this, returning to step S4, the control unit 15 carries out spectrometry on the color patch group on which spectrometry is not carried out.

Meanwhile, when YES is determined in step S15, the colorimetry means 187 calculates the reflectance of each wavelength of each color patch based on the output value of each wavelength which is acquired in each color patch 31 and the measurement value which relates to the reference color that is acquired in step S3 (step S17). That is, the colorimetry means 187 carries out colorimetry on each color patch and calculates chromaticity.

After this, the calibration means 188 updates the printing profile data which is stored in the memory 153 based on the chromaticity of each color patch that is recorded in the printing data for calibration and the chromaticity which is calculated in step S17 (step S18).

After step S18, the control unit 15 ends the process in the flow chart.

Actions and Effects of First Embodiment

In the embodiment, when the measurement region R is moved along one direction with respect to the color patch 31, the measurement start timing is detected based on the differential signal in which the detection signal according to the amount of received light from the measurement region R is obtained by differential processing in the differential circuit 213. For this reason, even if the position of the measurement region R with respect to the color patch 31 is not ascertained in advance, it is possible to easily detect the measurement start timing based on the differential signal. Accordingly, it is possible to suppress generation of defects such that the region other than the color patch that is the measurement target is measured by the measurement start position being deviated, and it is possible to carry out spectrometry on the color patch 31 with high precision.

In addition, even if a dimension of the color patch is set by adding to a margin which considers the positional deviation with respect to a minimum dimension of the color patch 31 according to movement speed due to the carriage moving unit 14, measurement time, and the like, since it is possible to suppress deviation from the measurement start position, it is possible to reduce the margin, and it is possible to reduce the dimension of the color patch. Accordingly, it is possible to shorten the time in which one color patch 31 passes through the measurement region R and it is possible to shorten the required time for spectrometry in comparison to a case where deviation from the measurement start position is suppressed by increasing the margin.

In the embodiment, when spectrometry is carried out on each color patch group, the initial wavelength of the variable wavelength interference filter 5 is set such that a change direction of each detection signal becomes a decreased direction (that is, the increase or decrease direction is the same) when the measurement region R within each color patch 31 is moved. In such a configuration, when detection of the measurement start timing is performed, only the decreased detection signal is input to the differential circuit 213. Thereby, it is possible to use the differential circuit 213 which is driven by a single power source. Accordingly, it is possible to simplify an device configuration in comparison to a case in which it is necessary to use a differential circuit which is driven by a dual-power source in order to correspond to the increase or decrease of the differential signal according to reflectance characteristics of adjacent color patches.

In addition, in the embodiment, the color patch group in which the plurality of color patches 31 are disposed is set as the measurement target such that the reflectance of each color patch 31 in the initial wavelength becomes small toward the +X side. Thereby, during detection of the measurement start timing of each color patch 31, even if the same predetermined wavelength is set, it is possible to set the change direction of the detection signal during detection as the decrease direction. When detection of the measurement start timing is performed, the initial wavelength of the variable wavelength interference filter 5 may not be modified, and it is possible to achieve simplification of spectrometry processing.

In addition, in the embodiment, the color patch group in which the plurality of color patches 31 are disposed is set as the measurement target such that the reflectance of each color patch 31 in the initial wavelength of the corresponding color phase becomes small toward the +X side. Then, detection of the measurement start timing is carried out by setting the initial wavelength as the characteristic wavelength. By configuring in this manner, since the characteristic wavelength which has a comparatively large reflectance of the color patch 31 is used and detection of the measurement start timing is performed, for example, other than the characteristic wavelength, it is possible to increase the output value of the detection signal in comparison to a case in which the wavelength in which the reflectance is relatively small is used. Accordingly, it is possible to improve the SN ratio of the detection signal and the differential signal, and it is possible to improve detection precision of the measurement start timing.

In addition, in the embodiment, the initial wavelength in spectrometry is set as the characteristic wavelength (detection wavelength) which is used in detection of the measurement start timing. By configuring in this manner, when spectrometry is carried out after the measurement start timing is detected, since it is not necessary to set the emission wavelength of the variable wavelength interference filter 5 to a wavelength which is different from the detection wavelength, it is possible to achieve shortening of the required time for spectrometry.

In the embodiment, the switch circuit 211 is controlled, the timing detection circuit 21 is set to the non-output state when spectrometry is carried out, and the timing detection circuit 21 is set to the output state from the end of spectrometry until the subsequent measurement start timing. Thereby, it is possible to suppress generation of erroneous detection of the start timing by referencing the differential signal according to the change of the detection signal while spectrometry is carried out.

In the embodiment, upon the color chart 3 described above being formed, it is possible to perform spectrometry on each color patch 31 which is included in the color chart 3. In addition, since it is possible to carry out colorimetry on the color patch 31 with high precision, the calibration means 188 is able to appropriately update the printing profile data based on the measurement results. That is, it is possible to appropriately perform color correction by carrying out feedback on the printing section and it is possible for a user to reproduce a desired color with high precision based on a difference of chromaticity in each color patch which is printed by the printing section 16 based on the printing data for calibration and chromaticity of each color patch based on measurement results which are actually measured with high precision.

Second Embodiment

Next, a second embodiment according to the invention will be described below. Here, as per the following description, the same configuration and the same processes as the first embodiment are given the same reference numerals, and description thereof is omitted or simplified.

In the second embodiment, with respect to the configuration of the first embodiment, furthermore, it is detected that there is a possibility that spectrometry is not appropriately carried out based on the detection signal from the timing detection circuit, and there is a configuration in which it is possible to carry out resetting of measurement conditions based on the detection results. That is, when the movement speed (scanning speed) of the spectroscope is large with respect to the set value, before spectrometry on the color patch 31 on the −X side ends out of two adjacent color patches 31, there are cases where the measurement region starts overlapping with the color patch 31 on the +X side. In this case, there is a concern that spectrometry is not appropriately carried out on the color patch 31 on the −X side, in addition, thereafter, there is a concern that spectrometry is also not appropriately carried out on the color patch 31. A spectrometry device according to the second embodiment is configured so as to be able to detect the measurement error as described above.

Figure 13:
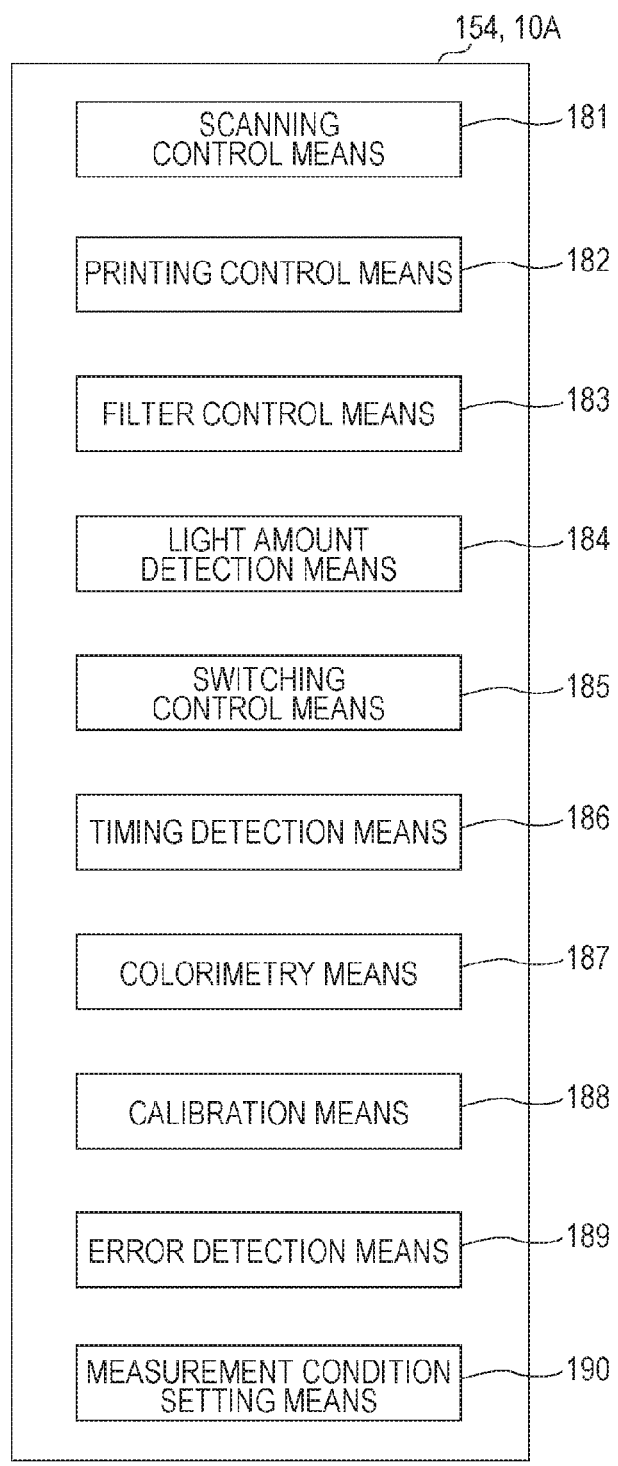
FIG. 13 is a block diagram illustrating a functional configuration of a CPU which is included in a control unit in a second embodiment.

FIG. 13 is a block diagram illustrating a functional configuration of the CPU 154 which is included in the control unit 15 of a printer 10A according to the second embodiment.

As shown in FIG. 13, the CPU 154 functions as the scanning control means 181, the printing control means 182, the filter control means 183, the light amount detection means 184, the switch control means 185, the timing detection means 186, the colorimetry means 187, the calibration means 188, error detection means 189, measurement condition setting means 190, and the like by executing reading of various programs which are stored in the memory 153.

The error detection means 189 detects the measurement error based on the detection signal from the timing detection circuit 21. For example, the scanning control means 181 moves the carriage 13 at a predetermined speed which is set in advance according to a color patch width, a measurement time which is necessary for spectrometry of each color patch, and the like. However, when an inclination or a deflection of the carriage guide shaft 141 is generated, there is a concern that the movement speed of the carriage 13 is faster than the predetermined speed. In this case, before the measurement time has elapsed, the measurement region starts overlapping with the subsequent color patch 31 and there is a possibility that it is not possible to appropriately carry out spectrometry. In a case where the error detection means 189 sets the switch circuit 211 to on using the switch control means 185, and the detection signal is high when the timing detection circuit 21 is set to the output state, the measurement error is detected. Thereby, at the timing at which the measurement time has elapsed, already in the measurement region, it is possible to detect the start of overlapping with the color patch 31 of the subsequent measurement target.

In addition, the error detection means 189 counts a number of detection errors, and stores in the memory 153.

The measurement condition setting means 190 sets the measurement conditions based on error detection results using the error detection means 189. For example, in the measurement condition setting means 190, in a case where error detection results are a predetermined number or more, the scanning speed of the carriage 13 is set by the scanning control means 181. An example of a setting method of the scanning speed will be described later.

Spectrometry Method

Next, a spectrometry method in the printer 10A of the embodiment will be described based on the drawings.

Figure 14:
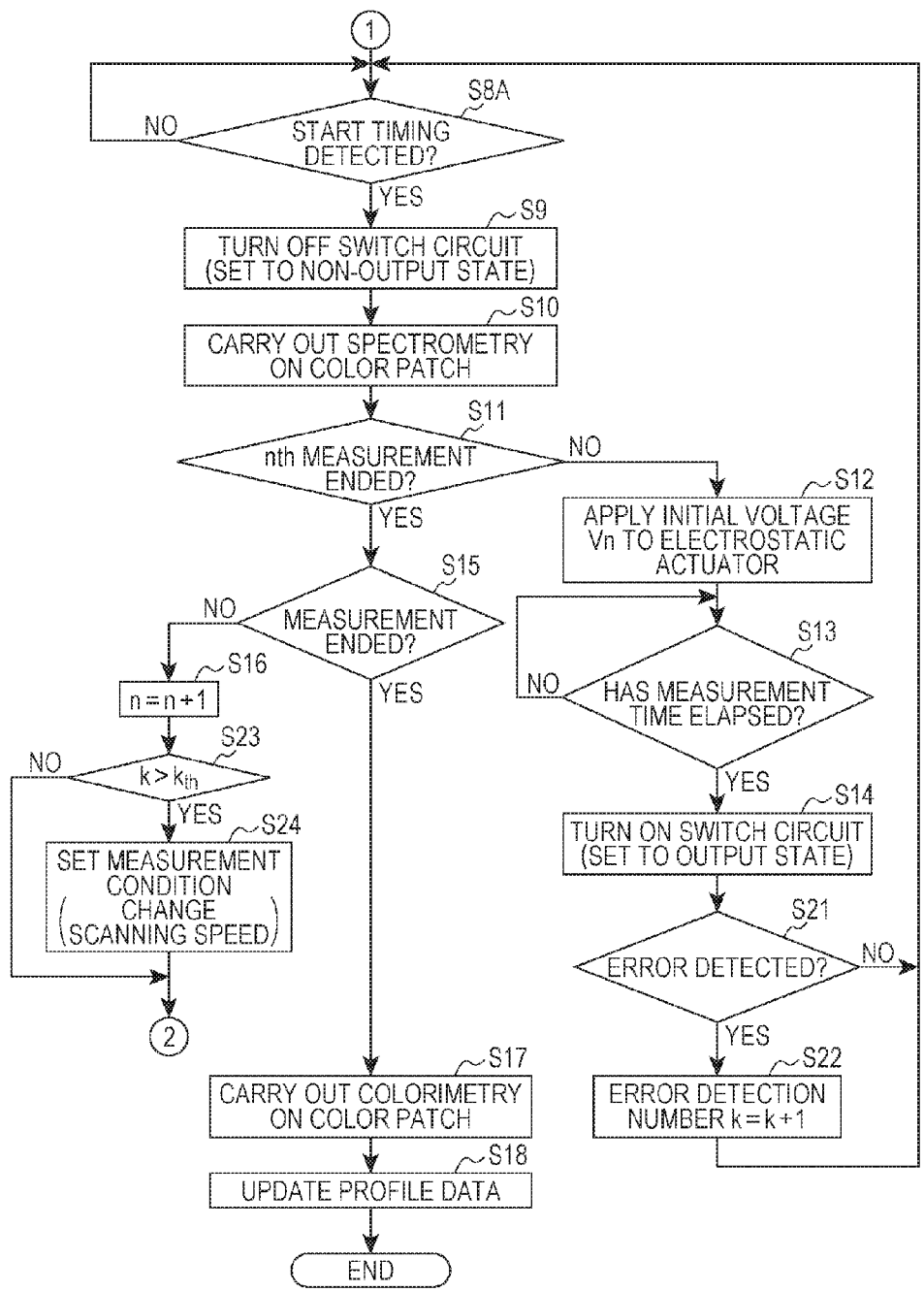
FIG. 14 is a flow chart illustrating a spectrometry method in a printer of the second embodiment.

FIG. 14 is a flow chart illustrating the spectrometry method in the printer 10A. Here, in the spectrometry method of the embodiment, after the processes of steps S1 to S7 which are indicated in FIG. 7 are carried out, the processes of each step which are indicated in FIG. 14 are carried out. That is, after the printer 10A prints the color chart 3 based on the conditions which are set in advance, and calibration (white calibration) is carried out, the first color patch group 30A is set on the scanning line, the timing detection circuit 21 is set as the output state and scanning by the carriage 13 starts (refer to FIG. 7).

Then, as shown in FIG. 14, the printer 10A detects the measurement start timing (step S8A). Here, in the embodiment, in a case where the measurement start timing is detected, since the measurement condition (scanning speed) as described later is set, the measurement condition setting means 190 acquires the time at which the measurement start timing is detected (refer to T1 and T2 in FIG. 15), and stored in the memory 153.

When the printer 10A detects the measurement start timing (step S8A: YES), the timing detection circuit 21 is set in the non-output state (step S9), and spectrometry is carried out on the color patch 31 (step S10). In a case where the printer 10A ends spectrometry on the color patch and spectrometry on all color patches 31 of the first color patch group 30A does not end (step S11: NO), the initial voltage Vn is applied to the electrostatic actuator (step S12), and the transmission wavelength of the variable wavelength interference filter 5 is set as the predetermined measurement time has elapsed from the start of spectrometry on the color patch 31 (step S13: YES), the timing detection circuit 21 is set to the output state (step S14). Next, the error detection means 189 carries out an error detection process which will be described later (step S21).

Error Detection Process

Figure 15:
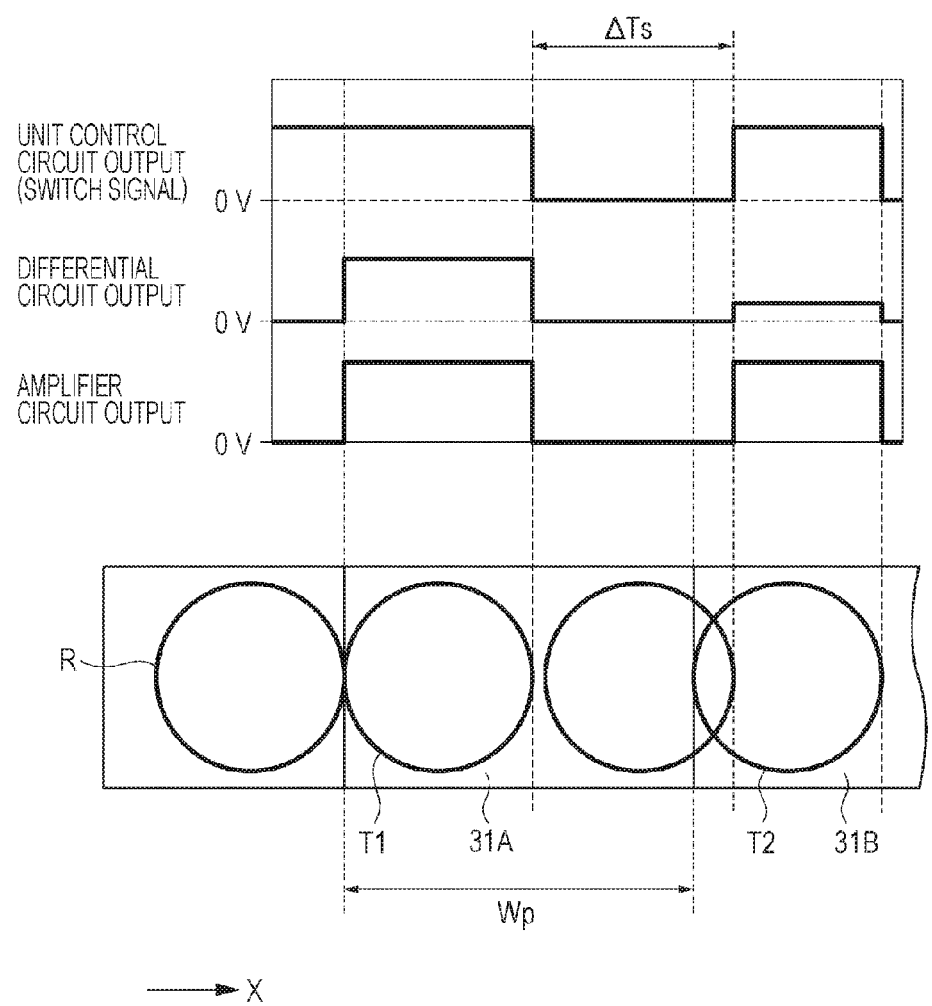
FIG. 15 is a diagram illustrating a relationship between an output signal in a timing detection circuit during error detection, and a position of a measurement region with respect to the color patch in the second embodiment.

FIG. 15 is a diagram schematically illustrating a relationship between the switch signal which is output from the unit control circuit 152, an output change of the output signal of the differential circuit 213 and the amplifier circuit 214, and the measurement region R with respect to the color patch 31 in a case where the error is detected.

In the example which is shown in FIG. 15, in a case where a predetermined measurement time ΔTs has elapsed, the measurement region R overlaps with both of the color patch 31A on which spectrometry is carried out and the color patch 31B which is the subsequent measurement target. In this case, since an amount of transmitted light changes according to movement of the carriage 13, at the timing at which the switch circuit 211 is set on, the output from the differential circuit 213 is high, and the output value of the detection signal from the timing detection circuit 21 is high. In this manner, in a case where the detection signal high is output at the timing at which the measurement time ΔTs has elapsed, there is a concern that spectrometry is not appropriately carried out on the color patch 31A.

In the embodiment, as shown in FIG. 14, in the error detection means 189, when the timing detection circuit 21 is set to the output state in step S14, it is determined that an error is detected (step S21: YES) in a case where the detection signal is high and it is determined that no error is detected (step S21: NO) in a case where the detection signal is low (that is, substantially "zero").

In a case where YES is determined in step S21, the error detection means 189 calculates a variable k=1 which indicates the error detection number (step S22), and the timing detection means 186 carries out the process in step S8A. Meanwhile, in a case where NO is determined in step S21, the error detection means 189 does not carry out step S22, and the timing detection means 186 carries out step S8A. Here, in step S8A, it is determined that the detection signal is changed from high to low and the measurement start timing is detected, and the time during detection is acquired (T2 in FIG. 15), and is stored in the memory 153.

Measurement Condition Setting Process

In the embodiment, the measurement condition is set when spectrometry is carried out on the color chart 3 (measurement condition setting process) based on the detection result due to the error detection process.

In detail, it is determined that spectrometry on the color patch group of the nth row ends (step S11: YES), and it is determined that spectrometry on the color chart 3 does not end (step S15: NO), and the scanning control means 181 carries out step S16.

Next, the measurement condition setting means 190 determines whether or not the error detection number k exceeds a threshold $k_{th}$ (step S23). The threshold $k_{th}$ is a permissible value of the error detection number, and for example, is appropriately set according to necessary measurement precision.

When the measurement condition setting means 190 determines that the error detection number k exceeds the threshold $k_{th}$ (step S23: YES), the measurement condition is set (step S24). Here, after step S24 is carried out, or in a case where NO is determined in step S23, returning to step S4, the control unit 15 carries out spectrometry on the color patch group of the subsequent row.

Here, a case in which the error is generated is as described above due to an actual scanning speed Vr of the carriage 13 being larger than a set speed Vs which is set in advance. In step S24, the measurement condition setting means 190 is able to suppress error generation by resetting the setting value of the scanning speed to a set speed Vsa which is smaller than the current set speed Vs.

Here, shown in FIG. 15, the actual scanning speed Vr uses a measurement start time T1 in the color patch 31A in which the error is detected, a measurement start time T2 of the color patch 31B which is a subsequent measurement target, and the patch width Wp of the color patch 31A, and it is possible to obtain as in Formula (1). Here, as shown in Formula (1), the scanning speed Vr uses an average speed during spectrometry on the color patch 31A.

For example, the set speed Vsa is able to use a difference value ΔV of the actual scanning speed Vr and the set speed Vs (refer to Formula (2)), and use a value which is reduced from the set speed Vr (refer to Formula (3)). Here, in the embodiment, since the error is detected in the plurality of color patches, the measurement condition setting means 190 calculates the set speed Vsa using the maximum scanning speed Vr.

Equation 1

$$Vr = Wp/(T2-T1) \quad (1)$$

$$\Delta V = Vr - Vs \quad (2)$$

$$Vsa = Vs - \Delta V \quad (3)$$

Here, other than setting the set speed Vsa as shown in Formula (3), the measurement condition setting means 190 may be configured such that a plurality of speeds which are set in advance as the set speed Vsa, and for example, the set speed Vsa may be set according to the value of the ΔV.

In addition, in the embodiment, the measurement condition setting means 190 which is configured to reset the scanning speed of the carriage 13 and measure the subsequent color patch group is exemplified, but the width Wp of the color patch may be reset based on the actual scanning speed Vr and the measurement time ΔTs (refer to Formula (4)). Here, also in this case, since the error is detected in the plurality of color patches, the measurement condition setting means 190 calculates the width Wp of the color patch using the maximum scanning speed Vr.

Equation 2

$$Wp = Vr \times \Delta Ts \quad (4)$$

Actions and Effects of Second Embodiment

In the embodiment, the error detection means 189 detects the measurement error in spectrometry based on the output value of the differential signal at the timing at which spectrometry ends. Thereby, it is possible to detect a possibility that spectrometry is not appropriately carried out, and it is possible to achieve reduced suppression of spectrometry precision based on the detection results.

In addition, in a period in which the measurement error is detected, the actual scanning speed Vr (for example, average speed) is acquired, and it is possible to suppress a reduction of measurement precision by resetting the scanning speed based on the scanning speed Vr and the set speed Vs. In addition, in a case where the measurement error is detected in a plurality of intervals, for example, it is possible to more reliably suppress generation of measurement error by resetting the scanning speed based on the maximum speed out of the actual scanning speed Vr.

In addition, the width Wp of the color patch is reset based on the actual scanning speed Vr and the measurement time ΔTs, and it is possible to suppress generation of the measurement error even if the scanning speed is not modified by forming a new color chart 3 using the width Wp.

MODIFICATION EXAMPLE

Here, the invention is not limited to each embodiment described above, and a configuration which is obtained due to modifications and improvements in a range in which it is possible to realize the object of the invention, each embodiment is appropriately combined, and the like is included in the invention.

In the embodiment, in order to detect the measurement start timing, a configuration is exemplified which uses the detection signal of the light receiving section which is built into the spectroscope, but the invention is not limited thereto, and for example, there may be a configuration in which the light receiving section of the timing detection is provided separately. In addition, there may be a configuration in which the light receiving section for the timing detection and the spectroscope 17 are integrally moved by one movement mechanism, and the movement mechanism may be respectively provided in the light receiving section for the timing detection and the spectroscope 17, and may be individually movable.

In addition, in each embodiment, a configuration in which the variable wavelength interference filter 5 is provided is exemplified, but the invention is not limited thereto. For example, the light receiving section of the timing detection may be provided separately from the spectroscope 17, and the measurement start timing may be detected using the detection signal when light is received from the measurement target using the light receiving section without passing through the variable wavelength interference filter 5. In this case, for example, the color patch group which has a difference of brightness between adjacent color patches may be used. In addition, the measurement start timing may be detected by utilizing a difference of an amount of reflected light between the white region and the color patch by providing the white region between each color patch. By configuring in this manner, it is possible to detect the measurement start timing using a simple configuration.

In each embodiment, a configuration is exemplified which moves the carriage 13 along the X direction, but the invention is not limited thereto. For example, there may be a configuration in which the carriage 13 is fixed, and the medium A is moved with respect to the carriage 13. In this case, it is possible to suppress vibration of the variable wavelength interference filter 5 accompanying movement of the carriage 13, and it is possible to stabilize the transmission wavelength of the variable wavelength interference filter 5.

In addition, an example is shown in which the measurement region R is scanned along the X direction with respect to the color patch 31 where a plurality are disposed along the X direction, but the measurement region R may be scanned along the Y direction with respect to the color patch 31. In this case, it is possible to relatively move the measurement region R with respect to the color patch 31 by sending the medium A in the Y direction using the transport unit 12.

In each embodiment, a case is exemplified in which the color patch group is used in which a plurality of color patches are disposed such that the reflectance is reduced in the predetermined wavelength toward the +X side, but the invention is not limited thereto. For example, the color patch group may be used in which the plurality of color patches are disposed such that reflectance is increased in the predetermined wavelength toward the +X side.

In each embodiment, a configuration is exemplified in which the measurement start timing is detected by setting the predetermined wavelength which is included in the wavelength region as the initial wavelength with respect to the color patch group which is configured by the color patch that has a peak wavelength of the reflectance in the same wavelength region, but the invention is not limited thereto.

For example, the wavelength which is not included in the wavelength region may be set as the initial wavelength, and the wavelength which is respectively different during detection of the measurement start timing of each color patch may be set as the initial wavelength.

In each embodiment, the measurement start timing is detected using the color patch group which includes the color patches of the same color phase, and using the characteristic wavelength of the color phase. However, the invention is not limited thereto, and for example, a color patch of a different color phase may be included in one color patch group, and the color patch group in which a plurality of color patches are disposed along one direction may be used.

In this case, in the same manner as each embodiment, it is possible to use the differential circuit 213 which is driven by a single power source by appropriately setting such that a set wavelength of the variable wavelength interference filter during detection of the measurement start timing of each color patch matches the change direction of the detection signal during detection to each color patch.

For example, the reflectance characteristic of each of two color patches which are adjacent in the scanning direction is acquired by referencing the printing data for calibration which is stored in the memory. Then, a wavelength in which a difference value in which reflectance of two color patches which are positioned on the downstream side (+X side) is subtracted from the reflectance of the first color patch which is positioned on the downstream side (−X side) in the scanning direction is a predetermined value or more (for example, maximum value) is set as the set wavelength of the variable wavelength interference filter during detection of the measurement start timing of two color patches. Thereby, when the measurement region moves from the first color patch to the second color patch, it is possible to change the detection signal in the decrease direction, and it is possible to use the differential circuit 213 which is able to be driven by a single power source as described above. Here, in a case where the detection signal is changed in an increase direction, the difference value which subtracts the reflectance of one color patch from the reflectance of the second color patch may set the wavelength which is a predetermined value or more to the set wavelength.

In addition, for example, the characteristic wavelength according to the color phase of each color patch is stored in the memory, and at least one of the characteristic wavelength of each of the adjacent first and second color patches is selected such that the increase or decrease direction of the detection signal matches during detection of the measurement start timing of each color patch. That is, the characteristic wavelength of the second color patch may be selected in the changing of the detection signal in the increase direction, and the characteristic wavelength of the first color patch may be selected in the changing of the detection signal in the decrease direction.

In addition, for example, the set wavelength for detecting the measurement start timing of each color patch is stored in advance in the memory with respect to the color patch group (color chart) of the measurement target, and the filter control means may acquire the set wavelength from the memory, and may set the wavelength of the variable wavelength interference filter.

By configuring in this manner, even in a case where spectrometry is performed on the color patch group which includes color patches of different color phases, it is possible to match the increase or decrease direction during detection of the measurement start timing to each color patch, and it is possible to use the differential circuit 213 which is driven by a single power source.

In each embodiment, a configuration is exemplified in which the color patch group is used in which the plurality of color patches are disposed without an interval, but the invention is not limited thereto. For example, the color patch group may be used in which the white region is disposed between the color patches. In this case, between two adjacent color patches, even in a case where the difference of reflectance reduces with respect to the initial wavelength, it is possible to use the difference of reflectance between the white region and the color patch by interposing the white region. Accordingly, during detection of the measurement start timing, it is possible to increase a change in the amount of received light, that is, it is possible to increase the output of the differential signal, and it is possible to reduce the detection precision.

In each embodiment, a configuration is exemplified in which the timing detection circuit 21 is set in the non-output state in which the detection signal is not output while carrying out spectrometry on the color patch by controlling the switch circuit 211. However, the invention is not limited thereto. That is, the switch circuit 211 may not be provided, and the same function may be realized using the processes at the control unit 15 side. For example, during spectrometry, the control unit 15 may be configured such that a value of the input detection signal is not referenced. In more detail, during spectrometry, for example, regardless of the actual input value of the detection signal, the control unit 15 may carry out a process in which the input value is "zero", and the mask process may be carried out. Thereby, even if the differential signal (detection signal) according to the detection signal during spectrometry is input to the control unit 15, it is possible to suppress an error operation using the differential signal (detection signal).

In the second embodiment, a configuration is exemplified in which the measurement error is detected when spectrometry is performed on the color patch group, and scanning speed is reset based on the detection results, but the invention is not limited thereto. For example, when spectrometry is carried out on the color patch in which the measurement error is detected by setting a process based on the detection result of the measurement error, spectrometry may be carried out at a scanning speed after resetting, and another color patch may use the scanning speed which is set in advance. Thereby, it is possible to suppress lengthening of the measurement required time of the color patch group, and it is possible to suppress a reduction of measurement precision and efficiency while suppressing generation of the measurement error. Here, in the manner of the second embodiment, in a case of scanning at a certain scanning speed and resetting the scanning speed, it is possible to simplify the operation of the spectrometry device more than in a case where spectrometry is carried out while changing the scanning speed.

In addition, when the measurement error is detected, spectrometry may be carried out again on the color patch in which the error is detected. In this case, it is possible to more reliably appropriately carry out spectrometry on each color patch. Accordingly, it is not necessary to perform spectrometry again on the color patch group, and it is possible to suppress the reduction of efficiency due to resetting.

Furthermore, the position (error position) in the Y direction is stored when the error is detected, and in the measurement of subsequent color patch groups, when the color patch which is disposed at the error position is measured, the scanning speed may be appropriately reduced or set to zero by the movement mechanism. In this case, in measurement of subsequent color patch groups, it is possible to suppress generation of a predetermined measurement error by a simple control.

In each embodiment, the variable wavelength interference filter 5 of a light transmission type through which light of the wavelength passes according to the gap G between reflective films 54 and 55 from the incident light is exemplified as the variable wavelength interference filter 5, but is not limited thereto. For example, the variable wavelength interference filter of the light transmission type which reflects light of the wavelength according to the gap G between the reflective films 54 and may be used. In addition, a variable wavelength interference filter with another form may be used.

In addition, the optical filter device 172 in which the variable wavelength interference filter 5 is stored in the chassis 6 is exemplified, but a configuration or the like may be set in which the variable wavelength interference filter 5 is provided with a direct spectroscope 17.

Furthermore, a configuration (rear spectrometry) is exemplified in which the optical filter device 172 which is provided with the variable wavelength interference filter 5 is provided from the light guiding section 174 within the light receiving section 173, but is not limited thereto. For example, the variable wavelength interference filter 5 within the light source section 171, or the optical filter device 172 which is provided with the variable wavelength interference filter 5 may be disposed, and may have a configuration (front spectrometry) which irradiates light which is spectrally set by the variable wavelength interference filter 5 on the medium A.

In each embodiment, the printer 10 which is provided with the spectrometry device is exemplified, but is not limited thereto. For example, the image forming section may not be provided, and there may be the spectrometry device which carries out only colorimetry on the medium A. In addition, for example, the spectrometry device of the invention may also be incorporated in a quality inspection device in which quality inspection of a printing material that is manufactured in a factory or the like is performed, otherwise the spectrometry device of the invention may be incorporated in any device.

In addition, the specific structure when carrying out the invention may be configured by appropriately combining each embodiment and application example in a range in which the object of the invention is able to be realized, or another structure or the like may be appropriately modified.

The entire disclosure of Japanese Patent Application No. 2015-125877 filed on Jun. 23, 2015 is expressly incorporated by reference herein.

What is claimed is:

1. A spectrometry device comprising:
a spectroscope that has a variable wavelength interference filter which incidents light from a measurement region, and a light receiving section which receives light from the variable wavelength interference filter and which outputs a detection signal according to an amount of received light;
a movement mechanism which relatively moves the spectroscope with respect to a measurement target and moves the measurement region with respect to the measurement target; and
a differential circuit which differentiates the detection signal and outputs a differentiation signal,
wherein spectrometry in which the amount of received light is detected by the light receiving section starts based on a differential signal.

2. The spectrometry device according to claim 1,
wherein the movement mechanism relatively moves the spectroscope along one direction with respect to the measurement target.

3. The spectrometry device according to claim 2,
wherein in a case where the measurement target is a color patch group which includes a plurality of color patches which are disposed along the one direction, a wavelength of light which passes through the variable wavelength interference filter is set for an output value of the detection signal when the measurement region is moved to within respective regions of the plurality of color patches which are included in the color patch group to be in the same increase or decrease direction.

4. The spectrometry device according to claim 3,
wherein in a case where the measurement target is a color patch group in which the reflectance with respect to a predetermined wavelength in each of the plurality of color patches is in the same increase or decrease direction along the one direction, the wavelength of light which passes through the variable wavelength interference filter is set to the predetermined wavelength.

5. The spectrometry device according to claim 4,
wherein in a case where the measurement target is a color patch group which has the same color phase in each of the plurality of color patches that are disposed in the one direction and in which the reflectance with respect to a characteristic wavelength of the color phase is in the same increase or decrease direction along the one direction in each of the plurality of color patches, the wavelength of light which passes through the variable wavelength interference filter is set to the characteristic wavelength.

6. The spectrometry device according to claim 3,
wherein the wavelength of the light which passes through the variable wavelength interference at the timing at which spectrometry starts is set as an initial wavelength in spectrometry.

7. The spectrometry device according to claim 1,
wherein a timing detection is performed with reference to the differential signal after the end of spectrometry without performing detection of a timing at which spectrometry starts with reference to the differential signal while spectrometry is carried out.

8. The spectrometry device according to claim 1,
wherein a measurement error for spectrometry is detected based on the output value of the differential signal at the timing at which spectrometry ends.

9. A spectrometry device, which carries out spectrometry on a measurement target, comprising:
a light receiving section which receives light from a measurement region and outputs a detection signal according to an amount of received light;
a movement mechanism which relatively moves the light receiving section with respect to the measurement target and moves the measurement region with respect to the measurement target; and
a differential circuit which differentiates the detection signal and outputs a differentiation signal,
wherein spectrometry starts based on the differential signal.

10. An image forming device comprising:
the spectrometry device according to claim 1; and
an image forming section which forms an image on an imaging forming target.

11. An image forming device comprising:
the spectrometry device according to claim 2; and
an image forming section which forms an image on an imaging forming target.

12. An image forming device comprising:
the spectrometry device according to claim 3; and
an image forming section which forms an image on an imaging forming target.

13. An image forming device comprising:
the spectrometry device according to claim 4; and
an image forming section which forms an image on an imaging forming target.

14. An image forming device comprising:
the spectrometry device according to claim 5; and
an image forming section which forms an image on an imaging forming target.

15. An image forming device comprising:
the spectrometry device according to claim 6; and
an image forming section which forms an image on an imaging forming target.

16. An image forming device comprising:
the spectrometry device according to claim 7; and
an image forming section which forms an image on an imaging forming target.

17. An image forming device comprising:
the spectrometry device according to claim 8; and
an image forming section which forms an image on an imaging forming target.

18. The image forming device according to claim 10,
wherein in the image forming section, a plurality of color patches are disposed along one direction, and a color patch group in which reflectance with respect to a predetermined wavelength in each of the plurality of color patches is in the same increase or decrease direction along the one direction is formed on the image forming target.

19. The image forming device according to claim 18,
wherein in the image forming section, a color patch group that is the measurement target in which color phases in each of the plurality of color patches are the same, and reflectance with respect to a characteristic wavelength of the color phase is in the same increase or decrease direction along the one direction is formed on the image forming target.

20. A spectrometry method, which uses the spectrometry device including a spectroscope that has a variable wavelength interference filter which incidents light from a measurement region, and a light receiving section which receives light from the variable wavelength interference filter and which outputs a detection signal according to an amount of received light, a movement mechanism which relatively moves the spectroscope with respect to a measurement target and moves the measurement region with respect to the measurement target, and a differential circuit which differentiates the detection signal and outputs a differentiation signal, wherein spectrometry on the measurement target is carried out, the method comprising:
moving the measurement region with respect to the measurement target; and
starting spectrometry in which the amount of received light is detected based on the differential signal.

* * * * *